(12) United States Patent
Wang et al.

(10) Patent No.: US 11,984,598 B2
(45) Date of Patent: May 14, 2024

(54) ION CONDUCTIVE LAYER AND METHODS OF FORMING

(71) Applicant: SAINT-GOBAIN CERAMICS & PLASTICS, INC., Worcester, MA (US)

(72) Inventors: Ruofan Wang, Natick, MA (US); Yuto Takagi, Natick, MA (US); Michael McGahan, Middletown, RI (US); Vladimir Ouspenski, Saint-Pierre-lès-Nemours (FR); Gaurav Assat, Paris (FR); Chuanping Li, Shrewsbury, MA (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 0 days.

(21) Appl. No.: 18/338,781

(22) Filed: Jun. 21, 2023

(65) Prior Publication Data

US 2023/0352688 A1    Nov. 2, 2023

Related U.S. Application Data

(63) Continuation of application No. 17/239,121, filed on Apr. 23, 2021, now Pat. No. 11,735,732.

(Continued)

(51) Int. Cl.
*H01M 4/36* (2006.01)
*H01M 4/505* (2010.01)
(Continued)

(52) U.S. Cl.
CPC ............. *H01M 4/60* (2013.01); *H01M 4/366* (2013.01); *H01M 4/505* (2013.01); *H01M 4/623* (2013.01);
(Continued)

(58) Field of Classification Search
CPC ...... H01M 4/366; H01M 4/621; H01M 4/622; H01M 4/623; H01M 6/18; H01M 6/182;
(Continued)

(56) References Cited

U.S. PATENT DOCUMENTS 7,824,795 B2   11/2010  Yoshida et al.
8,252,260 B2    8/2012  Iltis
(Continued)

FOREIGN PATENT DOCUMENTS

CN    108701860 A    10/2018
CN    109775744 A     5/2019
(Continued)

OTHER PUBLICATIONS

International Search Report and Written Opinion for PCT/US2021/028912, dated Aug. 12, 2021, 10 pages.
(Continued)

*Primary Examiner* — Christopher P Domone
(74) *Attorney, Agent, or Firm* — Abel Schillinger, LLP; Adrian Lawrence

(57) ABSTRACT

An ion conductive layer can include a hygroscopic ion conductive material, such as a halide-based material. In an embodiment, the ion conductive layer can include an organic material, ammonium halide, or a combination thereof.

20 Claims, 10 Drawing Sheets

Related U.S. Application Data

(60) Provisional application No. 63/014,231, filed on Apr. 23, 2020.

(51) Int. Cl.
  *H01M 4/60* (2006.01)
  *H01M 4/62* (2006.01)
  *H01M 10/0525* (2010.01)
  *H01M 10/0565* (2010.01)
  *H01M 4/02* (2006.01)

(52) U.S. Cl.
  CPC ... *H01M 10/0525* (2013.01); *H01M 10/0565* (2013.01); *H01M 2004/021* (2013.01); *H01M 2300/0082* (2013.01); *H01M 2300/0085* (2013.01)

(58) Field of Classification Search
  CPC ......... H01M 6/187; H01M 2300/0065; H01M 2300/008; H01M 2300/0082; H01M 8/1273; H01M 2008/128; H01M 10/0562; H01M 10/0565
  See application file for complete search history.

(56) References Cited

U.S. PATENT DOCUMENTS

| | | | |
|---|---|---|---|
| 8,304,115 B1 | 11/2012 | Petkov et al. | |
| 8,323,820 B2 | 12/2012 | Visco et al. | |
| 9,419,299 B2 | 8/2016 | Visco et al. | |
| 9,599,727 B2 | 3/2017 | Ouspenski et al. | |
| 10,374,254 B2 | 8/2019 | Van Berkel et al. | |
| 11,532,816 B2 | 12/2022 | Wang et al. | |
| 2006/0104880 A1 | 5/2006 | Iltis | |
| 2007/0117026 A1 | 5/2007 | Kumar et al. | |
| 2009/0226816 A1 | 9/2009 | Yoshida et al. | |
| 2010/0104948 A1 | 4/2010 | Skotheim et al. | |
| 2013/0202971 A1 | 8/2013 | Zhao et al. | |
| 2014/0099538 A1 | 4/2014 | Johnson et al. | |
| 2014/0287305 A1 | 9/2014 | Wachsman et al. | |
| 2015/0147619 A1 | 2/2015 | Chae et al. | |
| 2015/0111110 A1 | 4/2015 | Wanatabe et al. | |
| 2015/0287980 A1 | 10/2015 | Chen et al. | |
| 2017/0155169 A1 | 6/2017 | Hitz et al. | |
| 2018/0166759 A1 | 6/2018 | Zhamu et al. | |
| 2018/0205112 A1 | 7/2018 | Thomas-Alyea et al. | |
| 2018/0219251 A1 | 8/2018 | Rogren | |
| 2018/0301754 A1 | 10/2018 | Badding et al. | |
| 2019/0020024 A1 | 1/2019 | Wang et al. | |
| 2019/0088995 A1 | 3/2019 | Asano et al. | |
| 2019/0148733 A1* | 5/2019 | Oura | H01M 10/0562 429/479 |
| 2019/0229328 A1 | 7/2019 | Cho et al. | |
| 2019/0379056 A1 | 12/2019 | Chen | |
| 2020/0044284 A1 | 2/2020 | Fujino et al. | |
| 2020/0168904 A1 | 5/2020 | Nomoto | |
| 2020/0212481 A1* | 7/2020 | Nagamine | H01M 10/0562 |
| 2021/0143472 A1 | 5/2021 | Mimura et al. | |
| 2021/0269323 A1 | 9/2021 | Kubo et al. | |
| 2021/0320326 A1 | 10/2021 | Ouspenski et al. | |
| 2021/0320327 A1 | 10/2021 | Ouspenski et al. | |
| 2021/0328262 A1 | 10/2021 | Nishio et al. | |
| 2021/0336263 A1 | 10/2021 | Wang et al. | |
| 2021/0336265 A1 | 10/2021 | Takagi et al. | |
| 2021/0367263 A1 | 11/2021 | Lee et al. | |
| 2021/0376379 A1 | 12/2021 | Osada et al. | |
| 2022/0181637 A1 | 6/2022 | Jang | |
| 2022/0190437 A1 | 6/2022 | Jang | |
| 2022/0255079 A1 | 8/2022 | Takagi et al. | |
| 2022/0263091 A1 | 8/2022 | Wang et al. | |
| 2023/0335708 A1* | 10/2023 | Tan | H01M 4/622 |

FOREIGN PATENT DOCUMENTS

| | | |
|---|---|---|
| CN | 109980290 A | 7/2019 |
| CN | 110100333 A | 8/2019 |
| CN | 110265708 A | 9/2019 |
| CN | 110268573 A | 9/2019 |
| CN | 110350238 A | 10/2019 |
| CN | 110498995 A | 11/2019 |
| CN | 110534795 A | 12/2019 |
| DE | 102016216555 A1 | 3/2018 |
| DE | 102018205299 A1 | 10/2019 |
| EP | 3168914 A1 | 5/2017 |
| EP | 3419098 B1 | 11/2017 |
| EP | 3496202 A4 | 8/2019 |
| EP | 3553867 A1 | 10/2019 |
| EP | 3496202 A1 | 12/2019 |
| JP | 2511947 B2 | 7/1996 |
| JP | 2003002974 A | 1/2003 |
| JP | 2005089682 A | 4/2005 |
| JP | 2006244734 A | 9/2006 |
| JP | 2008300269 A | 12/2008 |
| JP | 2009238739 A | 10/2009 |
| JP | 2010212058 A | 9/2010 |
| JP | 2018521173 A | 8/2018 |
| JP | 2018025582 A1 | 5/2019 |
| JP | 2019145489 A | 8/2019 |
| KR | 19990063878 A | 7/1999 |
| KR | 20150015306 A | 2/2015 |
| KR | 20150031288 A | 3/2015 |
| KR | 20180046574 A | 5/2018 |
| KR | 20180076132 A | 7/2018 |
| KR | 20180115130 A | 10/2018 |
| WO | 2009108184 A1 | 9/2009 |
| WO | 2013125485 A1 | 8/2013 |
| WO | 2014036090 A1 | 3/2014 |
| WO | 2014052439 A1 | 4/2014 |
| WO | 2015144074 A1 | 10/2015 |
| WO | 2016069749 A1 | 5/2016 |
| WO | 2017116599 A2 | 7/2017 |
| WO | 2017192163 A1 | 11/2017 |
| WO | 2017215736 A1 | 12/2017 |
| WO | 2018002303 A1 | 1/2018 |
| WO | 2018025582 A1 | 2/2018 |
| WO | 2018085847 A1 | 5/2018 |
| WO | 2018183771 A1 | 10/2018 |
| WO | 2019135315 A1 | 7/2019 |
| WO | 2019135316 A1 | 7/2019 |
| WO | 2019135317 A1 | 7/2019 |
| WO | 2019135318 A1 | 7/2019 |
| WO | 2019135319 A1 | 7/2019 |
| WO | 2019135320 A1 | 7/2019 |
| WO | 2019135321 A1 | 7/2019 |
| WO | 2019135322 A1 | 7/2019 |
| WO | 2019135323 A1 | 7/2019 |
| WO | 2019135328 A1 | 7/2019 |
| WO | 2019135336 A1 | 7/2019 |
| WO | 2019135341 A1 | 7/2019 |
| WO | 2019135342 A1 | 7/2019 |
| WO | 2019135343 A1 | 7/2019 |
| WO | 2019135344 A1 | 7/2019 |
| WO | 2019135345 A1 | 7/2019 |
| WO | 2019135346 A1 | 7/2019 |
| WO | 2019135347 A1 | 7/2019 |
| WO | 2019135348 A1 | 7/2019 |
| WO | 2019146216 A1 | 8/2019 |
| WO | 2019146217 A1 | 8/2019 |
| WO | 2019146218 A1 | 8/2019 |
| WO | 2019146219 A1 | 8/2019 |
| WO | 2019146236 A1 | 8/2019 |
| WO | 2019146292 A1 | 8/2019 |
| WO | 2019146293 A1 | 8/2019 |
| WO | 2019146294 A1 | 8/2019 |
| WO | 2019146295 A1 | 8/2019 |
| WO | 2019146296 A1 | 8/2019 |
| WO | 2019146308 A1 | 8/2019 |
| WO | 2016197006 A1 | 12/2019 |
| WO | 2019240547 A1 | 12/2019 |
| WO | 2020022205 A1 | 1/2020 |
| WO | 2020137189 A1 | 7/2020 |

(56) References Cited

FOREIGN PATENT DOCUMENTS

| WO | 2021211711 A1 | 10/2021 |
|---|---|---|
| WO | 2021211763 A1 | 10/2021 |
| WO | 2021217045 A1 | 10/2021 |
| WO | 2021217075 A1 | 10/2021 |

OTHER PUBLICATIONS

International Search Report and Written Opinion for PCT/US2021/028950, dated Aug. 9, 2021, 12 pages.
International Search Report and Written Opinion for PCT/US2021/027289, dated Jul. 26, 2021, 12 pages.
International Search Report and Written Opinion for PCT/US2021/027359, dated Aug. 3, 2021, 14 pages.
Solid Polymner—an overview, ScienceDirect, https://www.sciencedirect.com/topics/engineering/solid-polymer, accessed Apr. 20, 2021; 13 pages.
Advanced Technologies R-2360, RTV silicone foam, Avantor, Dec. 2018, 3 pages.
Advanced Technologies R-2370, RTV silicone foam, Avantor, Dec. 2018, 2 pages.
Development of Roll-to-Roll Simultaneous Multilayer Deposition Methods for Solid-State Electrochemical Devices Using Highly Particulate Loaded Aqueous Inks: U.S. Department of Energy, Office of Energy Efficiency & Renewal Energy, Dec. 2019, 2 pages.
Ahmad, N.H. et al., "Ionic Conductivity and Electrical Properties of Carboxymethyl Cellulose—NH4CI Solid Polymer Electrolytes," Journal of Engineering Science and Technology, Aug. 2016, vol. 11(8), pp. 1-10.
Asano, T. et al. "Solid Halide Electrolytes with High Lithium-Ion Conductivity for Application in 4 V Class Bulk-Type All-Solid-State Batteries," Advanced Materials, 30 (2018), abstract only.
Bohnsack, A. et al.: "Ternary Halides of the A3 MX 6 Type. VI. Ternary Chlorides of the Rare-Earth Elements with Lithium, Li3MCI6(M=Tb-Lu, Y, Sc): Synthesis, Crystal Structures, and Ionic Motion," Physical Inorganic Chemistry, vol. 623, 1997, abstract only.
Bohnsack, A. et al., "Ternary Halides of the A3MX6 Type. VII. The Bromides Li3MBr6 (M=Sm-Lu, Y) : Synthesis, Crystal Structure, and Ionic Mobility", Physical Inorganic Chemistry, vol. 623, 1997, abstract only.
Choi, S. et al., "Bio-inspired Self-Healing Electrolytes for Li—S Batteries," Chem 3, 2017, pp. 383-389.
Choudhury, S. et al., "Solid State polymer electrolytes for high-performance lithium metal batteries," Nature Communications, 2019, V.10, pp. 1-8.
Collins, S.C. et al. "Lithium Chloride and Ammonia Complexes," Journal of Physical Chemistry, vol. 32, 11, 1928, pp. 1705-1719, first page only.
Famprikis, T. et al., "Fundamentals of inorganic solid-state electrolytes for batteries." Natute Materials, 2019, 14 pages.
Feinauer, M. et al. "Unlocking the Potential of Fluoride-Based Solid Electrolytes for Solid-State Lithium Batteries," ACS Appl. Energy Mater. 2019, V.2, N 10, pp. 7196-7203, abstract only.
Fuller, R. et al. "Electrical Conductivity in NH4Cl and ND4Cl Single Crystals," Journal of Physics and Chemistry of Solids, 31 (1970), pp. 1539-1545.
Fuzlin, A. F. et al., "Effect on Ammonium Bromide in dielectric behavior based Alginate Solid Biopolymer electrolytes," IOP Conf. Series: Materials Science and Engineering, 342, 2018, pp. 1-8.
Hitz, Gregory T. et al. "High-rate lithium cycling in a scalable trilayer Li-garnet-electrolyte architecture," Materials Today, vol. 22, Jan.-Feb. 2019, abstract only.
"Hayamizu, Kikuko et al. ""Relationship between Li+ diffusion and ion conduction for single-crystal and powder garnet-type electrolytes studied by 7Li PGSE NMRspectroscopy,""" Phys. Chem. Chem. Phys., 2019, 21, 23589-23597."
Homann, Gerrit et al. "Poly(Ethylene Oxide)-based Electrolyte for Solid-State-Lithium-Batteries with High Voltage Positive Electrodes: Evaluating the Role of Electrolyte Oxidation in Rapid Cell Failure," Scientific Reports, 10, Mar. 2020, 9 pages.
Kataoka, Kunimitsu et al. "Lithium-ion conducting oxide single crystal as solid electrolyte for advanced lithium battery application," Scientific reports, 2018, pp. 1-9.
Kerman, Kian et al., "Review—Practical Challenges Hindering the Development of Solid State Li Ion Batteries," Journal of The Electrochemical Society, 164 (2017), pp. A1731-A1744.
Lau, J. et al., "Sulfide Solid Electrolytes for Lithium Battery Applications," Advanced Energy Materials, 2018, 8, pp. 1-24.
Lee, K. et al., "Selection of binder and solvent for solution-processed all-solid-state battery," Journal of the Electrochemical Society, 164(9), 2017, pp. A2075-A2081 (abstract only).
Li, Xiaona et al. "Progress and perspectives on halide lithium conductors for all-solid-state lithium batteries," Energy & Enviromental Science, vol. 13, Royal Society of Chemistry, Mar. 3, 2020, pp. 1429-1461.
Li, X. et al., "Air-stable Li3InCl6 electrolyte with high voltage compatibility for all-solid-state batteries," Energy & Environmental Science 12(9), 2019, pp. 2665-2671.
Li, X. et al., "Water-Mediated Synthesis of a Superionic Halide Solid Electrolyte," Angew Chem Int Ed Engl., 2019, 58, pp. 16427-16432.
Liu, Boyang et al. "3D lithium metal anodes hosted in asymmetric garnet frameworks toward high energy density batteries" Energy Storage Materials 14 (2018) pp. 1-32.
Meyer, G. et al., "An Analysis of the Ammonium Chloride Route to Anhydrous Rare-Earth Metal Chlorides," Materials Research Bulletin, vol. 17, 1982, pp. 1447-1455, abstract only.
Meyer, G. et al., "Simple and Complex Halides," Handbook on the Physics and Chemistry of Rare Earths, vol. 28, 2000, pp. 53-129.
Meyer, Gerd et al. "The Amomonium-Bromide Route to Anhydrous Rare Earth Bromides Mbr3" Journal of the Less-Common Metals, 127, 1987, pp. 155-160.
Mo, Yifei,, "Solid Electrolyte Chemistry with Fast Ion Conduction and Good Electrochemical Stability: Insights from First Principles Computation," Department of Materials Science and Engineering, Maryland Energy Innovation Institute, University of Maryland, College Park, MD, 16 pages.
Muy, Sokseiha et al., "High-Throughput Screening of Solid-State Li-Ion Conductors Using Lattice-Dynamics Descriptors," iScience, vol. 16, 2019, pp. 270-282.
Nagel, R. et al., "6Li and 7Li MAS NMR Studies on Fast Ionic Conducting Spinel-Type Li2MgCl4, Li2-xCuxMgCl4, Li2-xNaxMgCl4, and Li2ZnCl4," Journal of Solid State Chemistry 165 (2002), pp. 303-311.
Owens, Boone B. et al., "High-conductivity solid electrolytes: MAg4I5." Science, vol. 157, Issue 3786 (1967), pp. 308-310, abstract only.
Park, K-H. et al., "High-Voltage Superionic Halide Solid Electrolytes for All-Solid-State Li-Ion Batteries," ACS Energy Letters, Jan. 30, 2020, 5, pp. 533-539.
Quinzeni, I. et al., "Stability of low-temperature Li7La3Zr2O12 cubic phase: The role of temperature and atmosphere," Materials Chemistry and Physics, 2017, V.185, pp. 55-64, abstract only.
Riphaus, Nathalie, et al. "Slurry-Based Processing of Solid Electrolytes: A Comparative Binder Study." Journal of The Electrochemical Society, 165 (16), 2018, pp. A3993-A3999.
Samson, A. J., et al., "A bird's-eye view of Li-stuffed garnet-type Li7La3Zr2O12 ceramic electrolytes for advanced all-solid-state Li batteries," Energy & Environmental Science, Issue 10, 2019, abstract only.
Samsudin, A.S. et al., "Ionic conduction study of enhanced amorphous solid bio-polymer electrolytes based carboxymethyl cellulose doped NH4Br," Journal of Non-Crystalline Solids, 2018, V. 497, pp. 19-29, abstract only.
Schlem, R. et al., "Mechanochemical Synthesis: A Tool to Tune Cation Site Disorder and Ionic Transport Properties of Li3MCI6 (M=Y, Er) Superionic Conductors," Advanced Energy Materials, 2019, pp. 1-10.

(56) References Cited

OTHER PUBLICATIONS

Seifert, H. J. "Ternary chlorides of the trivalent late lanthanides Phase diagrams, crystal structures and thermodynamic properties," Journal of Thermal Analysis and Calorimetry, vol. 83, issue 2, 2006, abstract only.

Shao, C. et al., "Structure and ionic conductivity of cubic $Li_7La_3Zr_2O_{12}$ solid electrolyte prepared by chemical co-precipitation method," Solid State Ionics, 2016, V. 287, pp. 13-16.

Sit, Y. K., "Ionic Conductivity Study on Hydroxyethyl Cellulose (HEC) doped with NH4Br Based Biopolymer Electrolytes," Research Journal of Recent Sciences, vol. 1 (11), 2012, pp. 16-21.

Steiner, H-J. et al., "Neue schnelle lonenleiter vom Typ $MM^{III}Cl_6$ ($M^I$=Li, Na, Ag; $M^{III}$=In, Y)" Zeitschrift für anorganische und allgemeine Chemie 613 (1992), pp. 26-30.

Sun, Y. et al., "Thermodynamic optimization and calculation of the $YCl_3$-ACl (A=Li, Na, K, Rb, Cs) phase diagrams." Calphad, vol. 39 (2012), pp. 1-10.

Tan, Darren H.S. et al. "Enabling thin and flexible solid-state composite electrolytes by the scalable solution process," ACS Applied Energy Materials, 2019, 2(9), pp. A-I.

Tang, Haolin et al. "Porosity-graded micro-porous layers for polymer electrolyte membrane fuel cells," Science Direct, Journal of Power Sources 166, 2007, pp. 41-46.

Wang, C. et al., "Stabilizing interface between $Li_{10}SnP_2S_{12}$ and Li metal by molecular layer deposition," Nano Energy (2018), V.53, pp. 168-174.

Wang, S. et al., "Lithium Chlorides and Bromides as Promising Solid-State Chemistries for Fast Ion Conductors with Good Electrochemical Stability." Angewandte Chemie International Edition, 58.24 (2019), 8039-8043.

Wentker, M. et al., "Bottom-Up Approach to Lithium-Ion Battery Cost Modeling with a Focus on Cathode Active Materials," Energies, 2019, 12, 504, pp. 1-18.

Writer, B. "Anode Materials, SEI, Carbon, Graphite, Conductivity, Graphene, Reversible, Formation." In: Lithium-Ion Batteries. Springer, Cham, 2019, abstract only.

Wu, J-F. et al., "Garnet-Type Fast Li-Ion Conductors with High Ionic Conductivities for All-Solid-State Batteries," ACS Appl. Mater. Interfaces 2017, V.9, pp. 12461-12468, abstract only.

Xue, W. et al., "The effect of sintering process on lithium ionic conductivity of $Li_{6.4}Al_{0.2}La_3Zr_2O_{12}$ garnet produced by solid-state synthesis," The Royal Society of Chemistry Adv, 2018, V.8, pp. 13083-13088.

Yamamoto, Mari et al. "Binder-free sheet-type all-solidstate batteries with enhanced rate capabilities and high energy densities," Scientific Reports, 2018, 10 pages.

Zhang, Tengfei et al., "Ammonia, a Switch for Controlling High Ionic Conductivity in Lithium Borohydride Ammoniates," Joule 2, Elsevier Inc., 2018, pp. 1522-1533.

Zhang, Z. et al., "New horizons for inorganic solid state ion conductors," Energy & Environmental Science, 2018, V.11, pp. 1945-1976.

Zhao, Y. et al., "Superionic Conductivity in Lithium-Rich Anti-Perovskites," Journal of the American Chemical Society 134(36), (2012), abstract only.

Takada, Kazunori, "Progress in solid electrolytes toward realizing solid-state lithium batteries," Journal of Power Sources, 394, (2018), pp. 74-85.

Dondelinger, Matthew et al. "Electrochemical stability of lithium halide electrolyte with antiperovskite crystal structure," Electrochimica Acta, 306, (2019), pp. 498-505.

Electronic Polymers, Encapsulating Systems, Araldite Casting Resin System, Vantico LTD., 2000, 6 pages.

Functional Products, Capture LOF, Cognis, 2009, 3 pages.

Ulvestad, Andrew "A Brief Review of Current Lithium Ion Battery Technology and Potential Solid State Battery Technologies," Applied Physics, 2018, 17 pages.

DE102018205299 English translation. Keller et al. Germany. Oct. 10, 2019 (Year: 2019).

\* cited by examiner

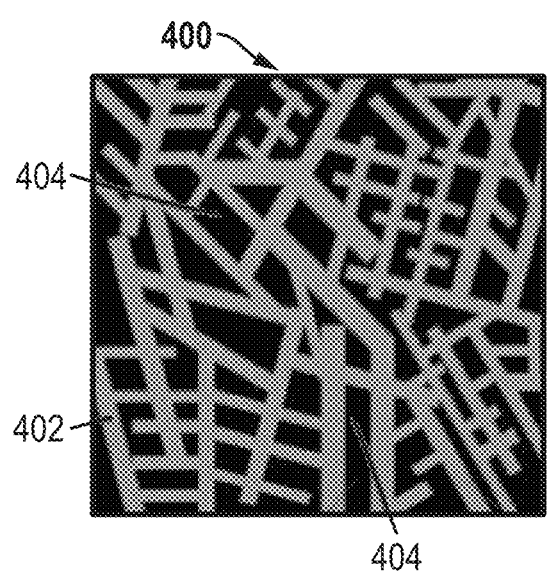
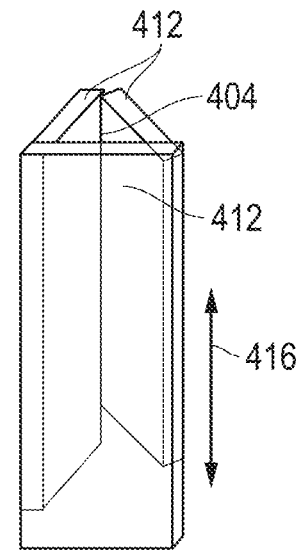
FIG. 4A  FIG. 4B
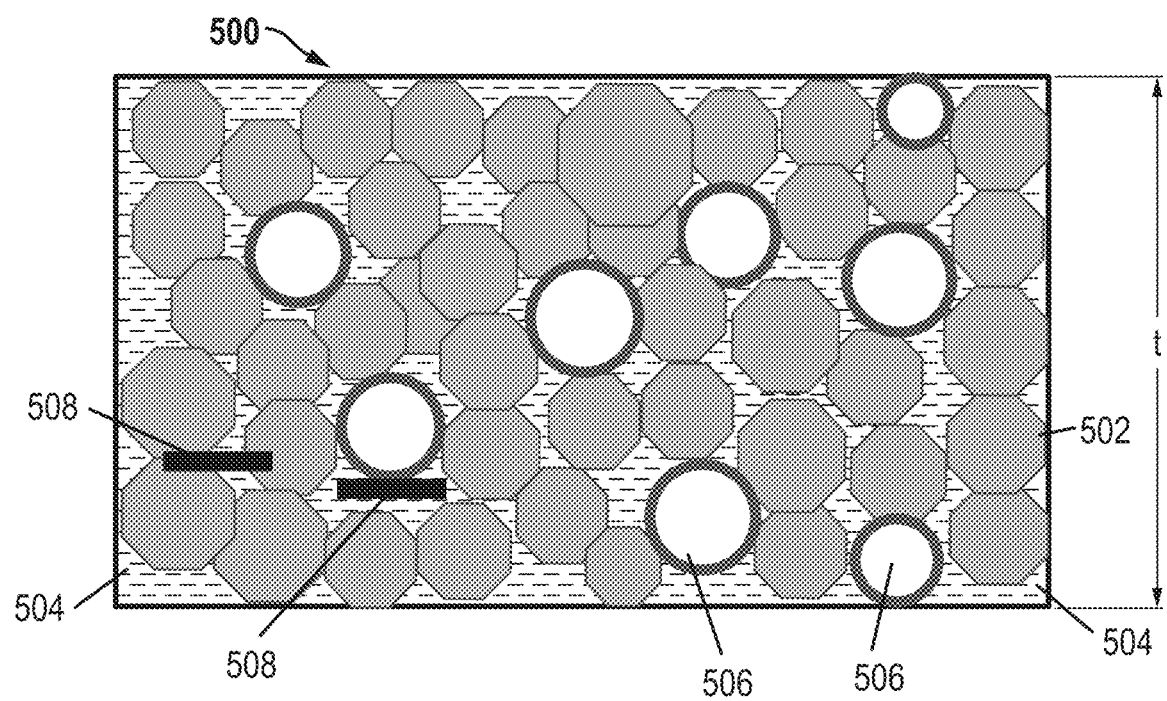
FIG. 5

ION CONDUCTIVE LAYER AND METHODS OF FORMING

CROSS-REFERENCE TO RELATED APPLICATION(S)

This application is a continuation of and claims priority under 35 U.S.C. § 120 to U.S. patent application Ser. No. 17/239,121, entitled "ION CONDUCTIVE LAYER AND METHODS OF FORMING," by Ruofan WANG, et al., filed Apr. 23, 2021, which claims priority under 35 U.S.C. § 119(e) to U.S. Provisional Application No. 63/014,231, entitled "ION CONDUCTIVE LAYER AND METHODS OF FORMING," by Ruofan WANG, et al., filed Apr. 23, 2020, which are assigned to the current assignee hereof and incorporated herein by reference in their entireties for all purposes.

FIELD OF THE DISCLOSURE

The following is directed to an ion conductive layer, devices including the ion conductive layer, and methods of forming the same, and to, in particular, a solid ion conductive layer, devices including the same, and methods of forming the same.

DESCRIPTION OF THE RELATED ART

Solid-state lithium batteries are expected to provide higher energy densities and faster recharging times and cause fewer safety concerns when compared to conventional lithium-ion batteries by enabling a lithium metal anode. Uses of solid-state electrolytes have been demonstrated to help improve performance of lithium metal anodes.

The industry continues to demand solid-state batteries with improved performance.

BRIEF DESCRIPTION OF THE DRAWINGS

The present disclosure may be better understood, and its numerous features and advantages made apparent to those skilled in the art by referencing the accompanying drawings.

FIG. 4A includes an illustration of a horizontal cross-section of an ion conductive layer in accordance with another embodiment herein.

FIG. 4B includes an illustration of a microstructure of a portion of an ion conductive layer in accordance with an embodiment.

FIG. 5 includes a cross-sectional illustration of an ion conductive layer in accordance with another embodiment herein.

Figure 1:
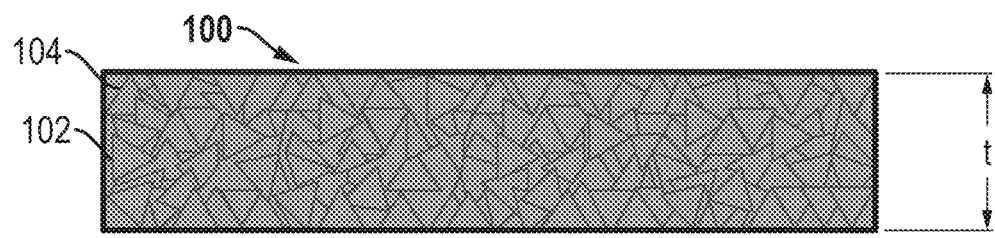
FIG. 1 includes an illustration of a cross-section of an ion conductive layer in accordance with an embodiment herein.

Skilled artisans appreciate that elements in the figures are illustrated for simplicity and clarity and have not necessarily been drawn to scale. For example, the dimensions of some of the elements in the figures can be exaggerated relative to other elements to help improve understanding of embodiments of the invention. The use of the same reference symbols in different drawings indicates similar or identical items.

DETAILED DESCRIPTION

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises", "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

The use of "a" or "an" is employed to describe elements and components described herein. This is done merely for convenience and to give a general sense of the scope of the invention. This description should be read to include one, or at least one, and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting.

Embodiments herein relate to a layer including an inorganic solid ion conductive material and an organic material. The layer may be in the form of a film, a tape, a sheet, or the like. In particular, the layer can be an ion conductive layer, and in particular, a solid ion conductive layer. For example, the ion conductive layer can have ionic conductivity of at least 0.05 mS/cm or higher. The ion conductive layer can include a hygroscopic ion conductive material, and in particular, a halide-based material. In particular instances, the ion conductive material can have lithium-ion conductivity. In an embodiment, the ion conductive layer may be porous and have a particular pore structure feature that can facilitate improved property and/or performance of the ion conductive layer. In another embodiment, the ion conductive layer may include a particular organic material that can facilitate improved property and/or performance of the ion conductive layer. For example, the ion conductive layer can have improved ionic current resistance, pore structure, compatibility, flexibility, chemical stability, electrochemical stability, or any combination thereof.

Embodiments further relate to methods of forming the ion conductive layer. The method can allow formation of a solid ion conductive layer having controlled thickness, porosity, and/or improved property. In particular, the method can allow improved formation of a solid ion conductive layer including a hygroscopic ion conductive material, or more particularly, a halide-based material. The method can include tape casting a green layer including the hygroscopic ion conductive material, a binder material, and optionally, a pore forming material. As used herein, a green layer is intended to refer to an unfinished ion conductive layer, wherein at least one or more process is needed to transform the green layer into a finally-formed ion conductive layer. Such processes can include, but are not limited to curing, heating, sintering, cooling, drying, pressing, molding, casting, punching, or any combination thereof.

In an embodiment, the ion conductive layer can be a component of an electrochemical device. For instance, the ion conductive layer can be a solid electrolyte layer. In another instance, the ion conductive layer can be a composite layer, such as an electrode layer, having a mixed ion conductivity and electron conductivity. In still another instance, an anode, a cathode, or both can include the ion conductive layer. In a particular embodiment, an electrochemical device can include a solid state battery. In more particular instances, the solid-state battery can include solid-state lithium battery.

In an embodiment, the ion conductive layer can include an ion conductive material including a hygroscopic material. In particular instances, the ion conductive material can have lithium-ion conductivity. In an aspect, the hygroscopic material can include a halide-based material. In another aspect, the hygroscopic material may include a sulfide-based material. In yet another aspect, the hygroscopic material can include an oxyhalide, a halide hydroxide, or a combination thereof.

In an embodiment, the ion conductive layer can include halide-based material including $M_{3-\delta}(Me^{k+})_f X_{3-\delta+k*f}$ (Formula I), wherein: $-3\leq\delta<3$; k is the valence of Me; $2\leq k<6$; and $0\leq f\leq 1$. In a particular aspect, the halide-based material may be represented by $M_{3-\delta}(Me^{k+})_f X_{3-\delta+k*f}$ (Formula II), wherein $-0.95\leq\delta\leq 0.95$.

M can include an alkali metal element including Li, Na, Rb, Cs, K, or any combination thereof. In particular instances, M can include Li. In an instance, M can include Li and another alkali metal element. In another example, M can consist of Li. In another example, M can consist of at least one of Li, Na, Cs, Rb, and K. In a particular instance, M can consist of Li, and at least one of Cs and Na.

Me can include a divalent element, a trivalent element, a tetravalent element, a pentavalent element, a hexavalent element, or any combination thereof. In instances when Me is a combination of elements, k can be the average value of the total valences of the elements. For example, when Me includes x mole of a trivalent element and y mole of a tetravalent element, $k=(3x+4y)/(x+y)$. In the instance Me includes a trivalent and tetravalent element in equal molar quantity, $k=3.5$. In more particular instances, k may be 3 or 4 or 5.

A further example of Me can include an alkaline earth element, such as Mg, Ca, Sr, and/or Ba, a Group 12 element, such as Zn, or any combination thereof. With respect to Groups of elements noted in this disclosure, reference is made to the IUPAC Periodic Table of the Elements published on Dec. 1, 2018.

X can include a halogen. For example, X can include one or more of Br, Cl, I, and F. For instance, X can include Cl, Br, or a combination thereof. In another instance, X can include F. In instances, X can include an anion group in addition to the halogen. Such anion group can include amide ($-NH_2$), hydroxide ($-OH$), $-BF_4$, $-BH_4$ (borohydride), or a combination thereof. The anion group may be included as an impurity or a dopant. In particular instances, X can consist of one or more halogen or a combination of one or more halogen and an anion group. In a particular aspect, X can consist of a halogen element. For example, X can consist of Cl, Br, or a combination thereof. In still another instance, X can consist of two or more of Cl, Br, F, and I. In a further instance, X can consist of F.

In another example, Me can include one or more trivalent element. For example, Me can include a Group 13 element, such as In and/or Al, a Group 3 element, a rare earth element, such as Sc, Y, and/or a lanthanide, or any combination thereof. In still another example, Me can include one or more tetravalent element, such as a Group 4 element (i.e., Zr and/or Hf), Sn, one or more pentavalent element, such as a Group 5 element (i.e., Nb, and/or Ta), Bi, or any combination thereof. In a particular example, Me can include a rare earth element, such as, Y, Sc, La, Ce, Pr, Nd, Pm, Sm, Eu, Tm, Gd, Tb, Dy, Ho, Lu, or any combination thereof.

In a particular aspect, the halide-based material may include $(Li_{1-d}Na_d)Li_2REX_6$ (Formula III), wherein RE is one or more rare earth element, and $0\leq d<1$. A particular example of RE can include Y, Gd, Er, or a combination thereof. For instance, RE can consist of Y. In another particular instance, RE can consist of Y and at least one other rare earth element.

In another particular aspect, the halide-based material may include $Li_3Y_ZRE_{1-Z}X_6$ (Formula IV), wherein $0<Z\leq 1$, RE is one or more rare earth element other than Y.

A particular example of a halide-based ion conductive material can include $Li_3YBr_6$, $Li_3YCl_6$, $Li_3(Al, Ga, In)X_6$, $(Li_{0.5},Na_{0.5})_2LiYCl_6$, $Li_3YBr_6$, $Li_{2.5}Y_{0.5}Zr_{0.5}Cl_6$, $Li_3Y_{0.95}Sm_{0.05}Br_3Cl_3$, $Li_3Y_{0.9}Sm_{0.1}Br_3Cl_3$, $Li_3YBr_3Cl_3$, $Li_3Y_{0.9}Er_{0.1}Br_3Cl_3$, $Li_3Y_{0.9}Lu_{0.1}Br_3Cl_3$, $Li_3Y_{0.9}Tb_{0.1}Br_3Cl_3$, $Li_3Y_{0.95}Bi_{0.05}Br_6$, $Li_3Y_{0.9}Dy_{0.1}Br_3Cl_3$, $Li_3Y_{0.9}Eu_{0.1}Br_3Cl_3$, $Li_{3.1}Y_{0.9}Ba_{0.1}Br_6$, $Li_{2.8}Y_{0.9}Ta_{0.1}Br_2Cl_2I_2$, $Li_{3.2}Y_{0.9}Sr_{0.2}Br_6$, $LiCsCl_2$, $Li_3YCl_3Br_3$ or the like, or any combination thereof.

In an embodiment, the solid ion conductive layer can include ammonium halide, such as $NH_4Cl$, $NH_4Br$, or a combination thereof. In an aspect, a dense ion conductive material can have improved performance with the presence of ammonium halide. For example, ammonium halide may be a dopant of hygroscopic material, such as the halide-based material. In another instance, ammonium halide may improve ionic conductivity of the ion conductive material. In another aspect, ammonium halide may be a residual material that remains in the solid ion conductive layer from a process of forming the solid ion conductive layer. In an example, ammonium halide may be added as a pore former material to the starting materials and removed to create pores for forming the solid ion conductive layer with improved pore characteristics. An exemplary pore characteristic can include porosity, average pore sizes, pore shapes, pore orientation, aspect ratio, pore size distribution, or any combination thereof.

In particular aspects, ammonium halide may be complexed with the hygroscopic material to facilitate improved formation and performance of the ion conductive layer. In exemplary implementations, ammonium halide may be used as a raw material in the process of forming a halide-based material such that ammonium halide can be complexed with the halide-based material. Subsequent sublimation of ammonium halide can facilitate formation of improved pore characteristics of the ion conductive layer.

In an embodiment, ammonium halide may be present in the ion conductive layer in a content that can facilitate improved property and performance of the solid ion conductive layer. In an aspect, the ion conductive layer can include at most 20 vol % of ammonium halide, such as at most 18 vol %, 15 vol %, 10 vol %, 8 vol %, at most 5 vol %, at most 3 vol %, at most 1 vol %, or at most 0.5 vol % for a total volume of the solid ion conductive layer. In a further aspect, the ion conductive layer may include at least 0.01 vol % of ammonium halide, such as at least 0.05 vol %, at least 0.1 vol %, at least 0.2 vol %, at least 0.5 vol %, at least 1 vol %, or at least 1.5 vol % of ammonium halide for a total volume f the solid ion conductive layer. It is to be understood the content of ammonium halide may include any of the minimum and maximum percentages noted herein.

In another example, the content of ammonium halide may be at most 10 wt % for a total weight of the ion conductive layer, such as at most 8 wt %, at most 5 wt %, at most 3 wt %, at most 1.5 wt %, at most 1 wt %, at most 0.5 wt %, or at most 0.2 wt % for the total weight of the ion conductive layer. In yet another example, the content of ammonium halide may be at least 0.01 wt % for the total weight of the ion conductive layer, such as at least 0.1 wt %, at least 0.2 wt %, at least 0.3 wt %, or at least 0.5 wt % for the total weight of the ion conductive layer. Moreover, the content of ammonium halide may include any of the minimum and maximum percentages noted herein.

In at least one non-limiting embodiment, the ion conductive layer may be essentially free of ammonium halide.

In another embodiment, the hygroscopic material can include lithium halides with an anti-perovskite crystal structure, a lithium oxyhalide, a lithium halide hydroxide, or a combination thereof. For instance, the hygroscopic material can include $Li_{3-x}M_{x/2}OA_{1-z}A'_{z}$, where A and A' are A-site halogens such as F, Cl, Br, or I. A particular example can include $Li_3OCl$, $Li_3OBr$, $Li_3O(Cl, Br)$ (e.g., $Li_3OCL_{0.5}Br_{0.5}$), $Li_2OHX$ (e.g., $Li_2OHCl$ and $Li_2OHBr$) or the like.

In another embodiment, the ion conductive material can include a sulfide-based material. The sulfide-based material can include an amorphous phase, a crystalline phase, or any combination thereof. A particular example of the sulfide-based material can include, but not limited to, $xLi_2S$–$yP_2S_5$ (LPS), such as $0.67Li_2S$-$0.33P_2S_5$, $80Li_2S$-$20P_2S_5$, $75Li_2S$-$25P_2S_5$, $70Li_2S$-$30P_2S_5$, and the like, $Li_2S$—X, wherein X represents at least one sulfide of $SiS_2$, $GeS_2$, and $B_2S_3$, such as $0.50Li_2S$-$0.50GeS_2$, $LiI$—$Li_2S$—$SiS_2$, such as $0.40LiI$-$0.36Li_2S$-$0.24SiS_2$ and the like, $0.05Li_4SiO_4$-$0.57Li_2S$-$0.38SiS_2$, $Li_3PO_4$—$Li_2S$—$SiS_2$, such as $0.01Li_3PO_4$-$0.63Li_2S$-$0.36SiS_2$ and the like, $LiI$—$Li_2S$—$B_2S_3$, such as $0.44LiI$-$0.30Li_2S$-$0.26B_2S_3$ and the like, $LiI$—$Li_2S$—$P_2S_5$, such as $0.45LiI$-$0.37Li_2S$-$0.18P_2S_5$ and the like, a-$Li_3PS_4$, LGPS (e.g., $Li_{10}GeP_2Si_2$), LPSCl (e.g., $Li_6PS_5Cl$), LPSBr (e.g., $Li_6PS_5Br$), LSPSCl (e.g., $Li_{9.54}Si_{1.74}P_{1.44}Si_{11.7}Cl_{0.3}$), $Li_{10.35}[Sn_{0.27}Si_{1.08}]P_{1.65}S_{12}$, or any combination thereof.

In a further embodiment, the solid ion conductive layer can include a particular content of the ion conductive material that can facilitate improved formation and property and/or performance of the solid ion conductive layer. In an aspect, the solid ion conductive layer can include at least 15 vol % of the ion conductive material for the total weight of the solid ion conductive layer, such as at least 20 vol %, at least 25 vol %, at least 30 vol %, at least 35 vol %, at least 45 vol %, at least 50 vol %, at least 55 vol %, or at least 60 vol % for the total volume of the ion conductive layer. In another aspect, the solid ion conductive layer can include at most 95 vol % of the ion conductive material for the total weight of the solid ion conductive layer, such as at most 90 vol %, at most 85 vol %, at most 80 vol %, at most 75 vol %, at most 70 vol %, at most 65 vol %, at most 60 vol %, at most 55 vol %, or at most 50 vol % for a total volume of the solid ion conductive layer. In another aspect, the ion conductive material can be in a content in a range including any of minimum and maximum percentages noted herein.

In an embodiment, the ion conductive layer can include an organic material that can facilitate improved formation and improved performance of the solid ion conductive layer. For example, the organic material can facilitate formation of the solid ion conductive layer with an improved property. The property can include pore characteristics, thickness, ionic conductivity, electron conductivity, wettability of an electrode active material, compatibility, flexibility, chemical stability, electro-chemical stability, or any combination thereof. In another example, the organic material may facilitate formation of improved pore characteristics of a porous ion conductive layer. In an aspect, the organic material may include one or more binder material, a solvent, or a combination thereof.

In an embodiment, the solid ion conductive layer can include an organic material that is not reactive to the ion conductive material. For example, the organic material can remain non-reactive to the ion conductive material in the process of forming the ion conductive layer, in the operating conditions that the solid ion conductive layer is applied, or both. In another example, in the process of forming the solid ion conductive material, the organic material may cause little or no adverse effect on the composition, ion conductivity, or both of the ion conductive material.

In a particular aspect, the organic material can have a particular Reactivity Value that can facilitate improved formation and improved property of the solid ion conductive layer. In an example, the organic material can have a Reactivity Value of at most 20% or less than 20%, such as at most 18%, at most 15%, at most 12%, or at most 10%. In further examples, organic material can have a Reactivity Value of less than 10%, such as at most 9%, at most 8%, at most 7%, at most 6%, at most 5%, at most 4%, at most 3%, or at most 2%. In another example, the organic material can have a Reactivity Value of 0% or greater than 0%, such as at least 0.01%, at least 0.1%, at least 0.2%, at least 0.3%, at least 0.5%, at least 0.8%, or at least 1%. Moreover, the Reactivity Value can be in a range including any of the minimum and maximum percentages noted herein. For example, the organic material can have Reactivity Value of up to at most 2%. In particular implementations, the organic material may have a Reactivity Value of less than 20% for a halide-based material including $Li_3YBr_6$ or a halide-based material including a crystalline structure similar to $Li_3YBr_6$, such as a layered crystalline structure, or more particularly, a monoclinic crystalline structure. In another particular implementation, the organic material may have a Reactivity Value of less than 10% for a halide-based material including $Li_3YCl_6$ or a halide-based material including a crystalline structure similar to $Li_3YCl_6$, such as a crystalline structure of hexagonal or trigonal crystal system.

The Reactivity Value can be determined as follows. Reactivity Value of the organic material to the ion conductive material can be tested by mixing the solid ion conductive material with the organic material at a weight percentage ratio of 10:90 and keeping the mixture at not greater than 100° C., such as 20° C. to 60° C., in an inert atmosphere for at least 12 hours and up to 24 hours. X-ray diffraction analysis can be performed to detect a change to the XRD pattern, such as changes to the characteristic peak of the ionic conductive material and changes of other peaks between before and after the test. For example, the change can include disappearance of the characteristic peak, changes to intensity of the characteristic peak, changes to intensity of characteristic peaks of certain impurity or degradation or decomposition product of the solid ion conductive material, or any combination thereof.

In particular, Reactivity Value of an organic solvent may be tested and determined as follows. A solvent can be mixed with the solid ion conductive material at a weight percentage ratio 90:10, wherein the solid ion conductive material is present in the mixture at 10 wt % for the total weight of the mixture, and the solvent is present in the mixture at 90 wt % of for the total weight of the mixture. After mixing for at least 12 hours and not more than 24 hours, the remaining solvent can be dried or evaporated at a temperature of up to 100° C. After complete removal of the solvent, the dry solid material can be collected and sealed in a gas-tight sample holder having a Kapton film window for performing X-ray diffraction (XRD) analysis from 25 to 80 degrees two-theta with the step size of 7.5 degree and step duration of 120 seconds. The entire testing can be performed in a dry environment with $H_2O$ content <1 ppm.

Figure 18:
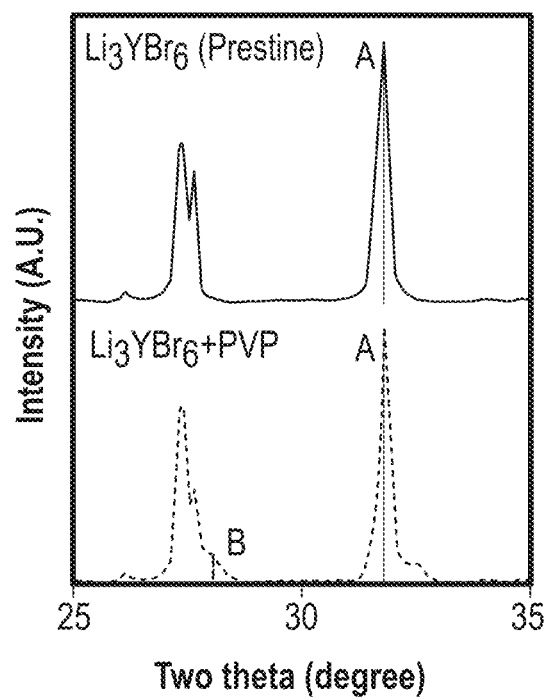

The Reactivity Value of the solvent material may be determined using the formula, $RV=[B/A]\times100\%$ based on the XRD pattern of the dry solid material, wherein A represents the intensity of the characteristic peak of the solid ion conductive material and B represents the intensity of the characteristic peak of a representative decomposition product of the solid ion conductive material. The representative decomposition product can be binary, including lithium and the major anion atom of the ion conductive material. For example, lithium halide can be the representative decomposition product of the halide-based material of embodiments herein. Accordingly, A can be the characteristic peak of the halide-based material, and B can be the characteristic peak of lithium halide. Referring to FIGS. 18, A and B are illustrated in the XRD pattern for testing Reactivity Value of an organic material with $Li_3YBr_6$ in comparison with the XRD pattern of the original $Li_3YBr_6$. The characteristic XRD peak of $Li_3YBr_6$ typically appears between 31 and 32.2 degrees two theta, and the characteristic peak of LiBr between 27.9 and 28.5 degrees two theta. The characteristic peak of $Li_3YCl_6$ is between 40.5 and 41.5 degrees two theta, and LiCl between 34.5 and 35.5 degrees two theta. When the XRD pattern of the remaining dry solid material after removal of the solvent does not include the characteristic peak of the representative decomposition product of the ion conductive material, such as lithium halide when the solvent is tested with halide-based material, and A is not 0, the Reactivity Value of the solvent can be determined as 0. When the XRD pattern of the dry solid material does not include the characteristic peak of the ion conductive material, the Reactivity Value of the solvent can be determined as indefinite. In the instance that the ion conductive material completely decomposes after mixing with the solvent, the Reactivity Value of the solvent can be regarded as indefinite.

In instances, the XRD pattern of the original ion conductive material may include the characteristic peak of the representative decomposition product. For example, the halide-based material may include lithium halide as an impurity. In those instances, the XRD pattern of the original ion conductive material may be used to determine $RI_O$, wherein $RI_O=[b/a]\times100\%$, b represents the intensity of the characteristic peak of the decomposition product and a represents the intensity of the characteristic peak of the ion conductive material. The Reactivity Value (RV) of the solvent may be determined by the formula, $RV=RI_{DS}-RI_O$, wherein $RI_{DS}=[B/A]\times100\%$, B is the intensity of the characteristic peak of the decomposition product of the dry solid material after removal of the solvent, and A is the intensity of the characteristic peak of the ion conductive material.

The Reactivity Value of a soluble organic binder may be tested and determined as follows. A solvent having a Reactivity Value of 0 can be used in the test. The binder, ion conductive material and solvent can be mixed at a weight percentage ratio of 10:10:80, wherein the binder is present in 10 wt % in the mixture for the total weight of the mixture, the solvent is present at 80 wt % for the total weight of the mixture, and the ion conductive material is present at 10 wt % for the total weight of the mixture. After mixing for at least 12 hours and up to 24 hours, the mixture may be dried to remove any remaining solvent at a temperature of not greater than 100° C. The dry solid mixture of the binder and ion conductive material can be collected and sealed in a gas-tight sample holder with a Kapton film window for XRD measurement. The entire testing can be performed in a dry environment with $H_2O$ content <1 ppm. The XRD analysis can be conducted from 25 to 80 degrees two theta, with the step size of 7.5° C. and step duration of 120 seconds rate, using an X-ray diffractometer.

The Reactivity Value of the soluble binder can be determined in the similar manner using the same formulas as described in embodiments herein for determining the Reactivity Value of the solvent.

The Reactivity Value of an insoluble organic binder may be tested and determined as follows. In instances when a binder is not soluble in a solvent having the Reactivity Value of 0, the ion conductive material and the insoluble binder can be mixed at a weight percentage ratio of 50:50, wherein each of the ion conductive material and insoluble binder is present in the mixture at 50 wt % for the total weight of the ion conductive material and insoluble binder. The mixture can be heated to melt the binder into the liquid state. After the binder is completely melted, mixing can continue for at least 1 hour to up to 12 hours. After mixing, the mixture of the binder and the ion conductive material is allowed to cool down and solidify and collected and sealed in a gas-tight sample holder with a Kapton film window for performing an XRD analysis. The entire testing can be performed in a dry environment with $H_2O$ content <1 ppm. XRD analysis can be conducted from 25 to 80 degrees two theta, with step size of 7.5° C. and step duration of 120 seconds rate, using an X-ray diffractometer.

The Reactivity Value of the insoluble binder can be determined in a similar manner using the same formulas as described in embodiments herein for determining the Reactivity Value of the solvent.

In an aspect, the organic material can have a particular Moisture Absorption Rate (referred to as "MAR" hereinafter) that can facilitate improved formation and improved property of the solid ion conductive layer. In an example, the organic material can have a MAR of at most 1.0 wt %, such as at most 0.8 wt %, at most 0.5 wt %, at most 0.3 wt %, or at most 0.1 wt %.

In another example, the organic material can have a MAR of 0 wt % or at least 0.01 wt % or at least 0.03 wt %. In a further example, the organic material can have the MAR in a range including any of the minimum and maximum percentages noted herein. For example, the organic material can have a MAR of up to 0.3 wt %.

The MAR can be tested and determined as follows. A specimen of the organic material having a specified dimension can be placed in distilled water or exposed to humid air (i.e., 50% relative humidity) at 23° C. to 60° C. for 24 hours. Moisture Absorption Rate can determined by the formula, $MAR=[(W_{AE}-W_{BE})/W_{BE}]\times100\%$, wherein $W_{BE}$ is the weight of the dried specimen, and $W_{AE}$ is the weight of the specimen prior to exposure to water or humid air. The specimen can be dried in an oven and then placed in a desiccator to cool. Immediately upon cooling, the specimen is weighed to obtain $W_{BE}$. Alternatively, the MAR can be determined according to ASTM D570 or ISO 62.

In an aspect, the organic material can have a hydrophobic portion, a lipophilic portion, or a combination thereof. In particular aspect, the organic material can have a particular hydrophile-lipophile balance (referred to as "HLB" hereinafter) value that can facilitate improved formation and improved property of the solid ion conductive layer. In another particular aspect, organic solvent and organic binder material having different HLB values may be used to form the ion conductive layer. In an example, the organic material can have an HLB value of at most 10, such as at most 9.6, at most 9, at most 8.8, at most 8.2, at most 7.6, at most 7.3, at most 7, at most 6.6, at most 6, at most 5.6, at most 5, at most 4.8, at most 4.2, at most 4, at most 3.8, at most 3.3, at most 3, at most 2.6, at most 2.2, at most 2, at most 1.5, at most 1, at most 0.5, or at most 0.1. In another example, the organic material can have an HLB value of 0 or higher, such as at least 0.001, at least 0.005, at least 0.01, at least 0.05, at least 0.0.08, or at least 0.1. In particular instances, the organic material may have an HLB value of 0. In a further example, the organic material can have an HLB value in a range including any of the minimum and maximum values noted herein. For example, the organic material can have an HLB value of up to 4. In another example, organic solvent may have an HLB value lower than an HLB value of organic binder material. In more particular implementations, solvents may have an HLB value of 0. In another more particular implementation, organic binder materials may have an HLB value of 0 or greater than 0, such as up to 10 or less than 10.

The HLB value can be determined according to Grifin's Mathematical method using the formula, $HLB=20\times M_h/M$, wherein $M_h$ is the molecular mass of the hydrophilic portion of the organic material, and M is the molecular mass of the whole organic material. To aid understanding, using an exemplary scale of HLB of 0 to 20, an HLB value of 0 can correspond to a completely lipophilic/hydrophobic molecule, and a value of 20 can correspond to a completely hydrophilic/lipophobic molecule.

Exemplary hydrophilic groups can include N (Tertiary Amine), —COOH (Carboxyl), —O— (Ether), —OH (Hydroxyl), —COO— (Ester), C═O (Carbonyl), or any combination thereof. Exemplary lipophilic groups may include —C—N(Nitrile), —CH$_3$ (Methyl), ═CH$_2$ (Methylene), —CH$_2$—, —CH═, —C$_6$H$_5$(Phenyl group), —F (Fluoro group), —Cl (Chloro group), or any combination thereof.

In an embodiment, the organic material can have a particular dielectric constant that can facilitate improved formation, property and/or performance of the solid ion conductive layer. In an aspect, the organic material may have a dielectric constant of at most 35, such as at most 33, at most 31, at most 29, at most 26, at most 23, at most 20, at most 19, at most 17, at most 15, at most 13, at most 12, at most 11, at most 10.5, at most 10, at most 9, at most 8, at most 7, at most 6, at most 5, at most 4, at most 3, or at most 2. In another aspect, the organic material may have a dielectric constant of at least 0.5, such as at least 1, at least 2, at least 3, at least 4, or at least 5. Moreover, the organic material may include a dielectric constant in a range including any of the minimum and maximum values noted herein.

In a particular embodiment, the organic material may include a particular HLB value, a particular Reactivity Value, a particular dielectric constant, or any combination thereof. In an aspect, the organic material may include a solvent material having an HLB value of 0, a Reactivity Value of at most 20%, a dielectric constant of at most 35, or any combination thereof. In particular instances, the organic material may include a solvent including an HLB value of 0, a Reactivity Value of less than 20%, and a dielectric constant of at most 12. A more particular example of an organic solvent can include heptane, cyclohexane, dibromomethane, dichloromethane, 1,2-dichloroethane, or any combination thereof.

In a further aspect, the organic material may include a binder material including a particular HLB value, a particular Reactivity Value, or any combination thereof. For example, the organic binder material may include an HLB value of less than 10 and a Reactivity Value of less than 20%. In another example, the organic binder material may include an HLB value of less than 10 and a Reactivity Value of less than 10%. More particular example of an organic binder can include hydrogenated nitrile butadiene rubber, Styrene butadiene rubber, Polyisobutylene, Poly(vinylidene fluoride), Poly(acrylonitrile), Paraffin wax, Polyethylene, Polyvinyl chloride, Poly(ethylene oxide), Polyvinyl pyrrolidone, Poly(methyl methacrylate), or any combination thereof.

In an aspect, the organic material can include a polymer, such as a thermoset, thermoplastic, or any combination thereof.

A particular example of the organic material can include at least one polymer selected from the group consisting of poly(propylene oxide), polyvinyl chloride, poly(vinylidene fluoride), poly(acrylonitrile), poly(dimethysiloxane), poly[bis(methoxy ethoxyethoxide)-phosphazene], polypropylene glycol, polyethylene carbonate, polycaprolactone, poly(trimethylene carbonate), paraffin wax, polyisobutylene, polyvinyl pyrrolidone, hydrogenated nitrile butadiene rubber, styrene-butadiene rubber, high density polyethylene, low density polyethylene, poly(ethylene oxide), polyurethane, polystyrene, poly(methyl acrylate), poly(vinylidene fluoride)-co-hexafluoropropylene, poly(acrylonitrile-co-butadiene), poly(styrene-butadiene-styrene), and styrene-ethylene-butylene-styrene. In a more particular example, the organic material can consist of one or more polymers selected from the group consisting of poly(propylene oxide), polyvinyl chloride, poly(vinylidene fluoride), poly(methyl methacrylate), poly(acrylonitrile), poly(dimethysiloxane), poly[bis(methoxy ethoxyethoxide)-phosphazene], polypropylene glycol, polyethylene carbonate, polycaprolactone, poly(trimethylene carbonate), paraffin wax, polyisobutylene, polyvinyl pyrrolidone, hydrogenated nitrile butadiene rubber, styrene-butadiene rubber, high density polyethylene, low density polyethylene, poly(ethylene oxide), polyurethane, polystyrene, poly(methyl acrylate), poly(vinylidene fluoride)-co-hexafluoropropylene, poly(acrylonitrile-co-butadiene), poly(styrene-butadiene-styrene), and styrene-ethylene-butylene-styrene.

In another particular example, the organic material can include a binder material including silicone. An example of silicone can include liquid silicone rubber. In a particular example, the organic material can include polydimethylsiloxane (PDMS), vinyl-terminated PDMS, hydride functional siloxanes, methylhydrosiloxane-dimethylsiloxane copolymer, or any combination thereof. In further instances, a catalyst can be used with the silicone material for forming the ion conductive layer. A particular example of catalyst can include platinum, platinum complex, or a combination thereof. In particular instances, the catalyst may be in a solvent material, such as xylene. In a particular implementation, the catalyst can include a complex of platinum in xylene.

Referring to FIG. 1, a cross-section view of an exemplary ion conductive layer 100 is illustrated, including an organic material 104, such as a binder material, and the ion conductive material 102. It is to be appreciated the conductive material 102 can include particles having the cross-sectional shape of triangles, as illustrated, or a different shape. For example, the ion conductive particles may have a regular shape, such as sphere, cube, and/or prism, or an irregular shape, or any combination thereof. In another instance, the particles may have a cross-sectional shape including circle, oval, ellipse, polygon, or any combination thereof.

In an embodiment, the ion conductive layer can include a particular content of the organic material that can facilitate improved formation and performance of the ion conductive layer. For example, the ion conductive layer can include at least 1 vol % of the organic material for a total volume of the ion conductive layer, such as at least 2 vol %, at least 5 vol %, at least 10 vol %, at least 15 vol %, at least 20 vol %, at least 25 vol %, at least 30 vol %, at least 35 vol %, at least 40 vol %, at least 45 vol %, or at least 50 vol %. In another example, the ion conductive layer may include at most 50 vol % of the organic material for the total volume of the ion conductive layer, such as at most 48 vol %, at most 45 vol %, at most 40 vol %, at most 36 vol %, at most 30 vol %, at most 25 vol %, at most 20% vol %, at most 15 vol %, or at most 10 vol % for the total volume of the ion conductive layer. Moreover, the content of the organic material may be in a range including any of the minimum and maximum percentages noted herein. In at least one non-limiting embodiment, the ion conductive layer may be essentially free of the organic material.

In an embodiment, the ion conductive layer can further include a lithium salt dispersed in the organic material. The lithium salt may facilitate improved ion conductivity of the ion conductive layer. An example of the lithium salt can include, but not limited to, $LiPF_6$, $LiClO_4$, $LiBF_4$, $LiAsF_6$, LiTf, LiSA, LiFSI, LiTFSI, LiBETI, LiCTFSI, LiBOB, LiTDI, LiPDI, LiDCTA, $LiB(CN)_4$, $LiSbF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ or a combination thereof. In a particular implementation, the organic material can include a polymeric electrolyte material as a carrier of one or more lithium salt. An exemplary polymeric electrolyte material can include poly(ethylene oxide), poly(propylene oxide), polyvinyl chloride, poly(vinylidene fluoride), poly(acrylonitrile), poly(dimethysiloxane), poly[bis(methoxy ethoxyethoxide)-phosphazene], polyethylene carbonate, polypropylene glycol, polycaprolactone, poly(trimethylene carbonate) or any combination thereof. Lithium salt can form a chelate by complexation with one or more entities of a polymeric electrolyte material. In particular implementations, the solid ion conductive layer may include a first phase formed by the solid ion conductive material, such as the halide-based material, and a second phase including the polymeric electrolyte material complexed with lithium salt.

Figure 2:
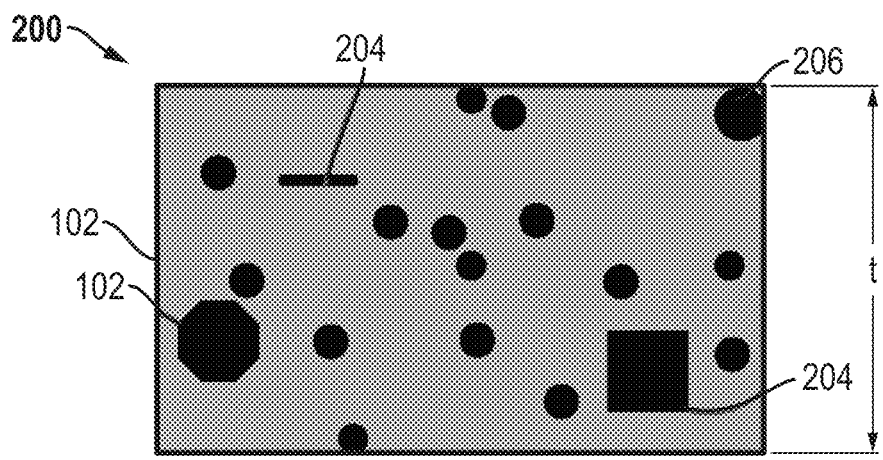
FIG. 2 includes a cross-sectional illustration of an ion conductive layer in accordance with another embodiment herein.

Referring to FIG. 2, a cross-sectional view of an exemplary ion conductive layer 200 is illustrated, including the lithium-ion conductive material 202, an organic material 206, and ammonium halide particles 204 having different shapes, such as cube, octahedron, and an elongated shape, such as a needle, a rod, or any combination thereof. In another example, the lithium-ion conductive layer 200 may include ammonium halide particles having the same shape, such as elongated shape, or a combination of any two shapes. In another example, the ammonium halide can have spherical shapes, another geometrical shape, or a 3-dimensional shape. In at least one embodiment, the solid ion conductive layer may be essentially free of ammonium halide.

In an embodiment, the ion conductive layer can include a dense layer. In an aspect, the ion conductive layer can have a porosity of at most 10 vol % for a total volume of the ion conductive layer. For example, the ion conductive layer can include at most 9vol %, at most 8 vol %, at most 7 vol %, at most 6 vol %, at most 5 vol %, at most 4 vol %, at most 3 vol %, at most 2 vol %, or at most 1 vol % of porosity for the total volume of the ion conductive layer. In another instance, the ion conductive layer may include at least 0.05 vol % of porosity for the total volume of the ion conductive layer, such as at least 0.1 vol %, at least 0.5 vol %, or at least 1 vol %.

Moreover, the porosity of the ion conductive layer can be in a range including any of the minimum and maximum percentages noted herein. In another aspect, the ion conductive layer can include a density of greater than 90% of the theoretical density. For instance, the density can be at least 92%, such as at least 94%, or at least 96% of the theoretical density. In another instance, the ion conductive layer may have a density of at most 99.99% of the theoretical density, such as at most 99% of the theoretical density. Moreover, the density of the ion conductive layer can be in a range including any of the minimum and maximum percentages noted herein. In particular implementations, the ion conductive layer can be a dense layer, such as a separator, e.g., an electrolyte, in an electrochemical device.

Figure 13:
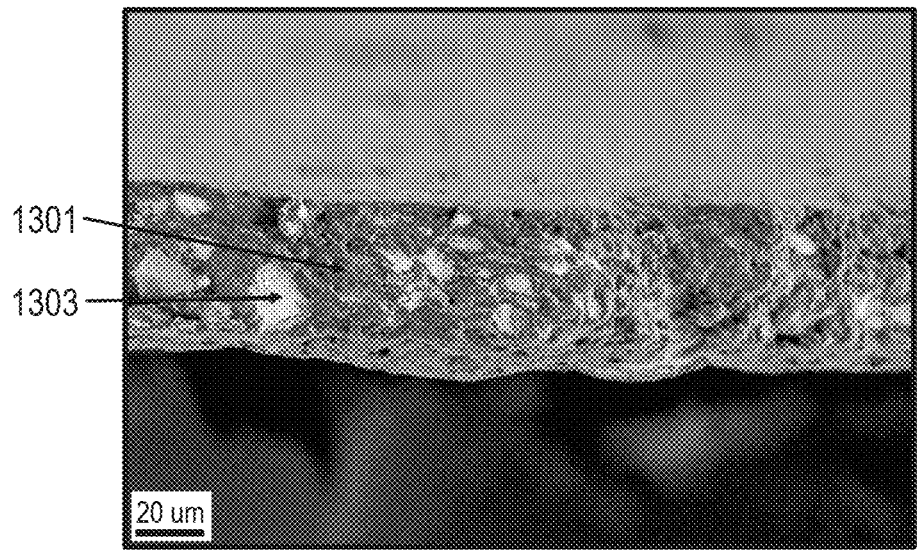
FIG. 13 includes a SEM image of a cross-section of an exemplary solid ion conductive layer according to an embodiment.

FIG. 13 includes a SEM image of a cross-section of an exemplary dense ion conductive layer according to an embodiment herein. The ion conductive layer includes a halide material 1303 and an organic binder material 1301. In the illustrated example, the halide material can be represented by a general formula $Li_3YBr_6$, and the organic binder material is hydrogenated nitrile butadiene rubber (also referred to as "HNBR" in this disclosure).

In an embodiment, the ion conductive layer can include a porous layer. In a further aspect, the ion conductive layer can include a particular porosity that can facilitate improved formation and performance of the ion conductive layer. For instance, the porosity can be at least 1 vol % for a total volume of the porous layer, such as at least 2 vol %, at least 5 vol %, at least 10 vol %, at least 15 vol %, at least 20 vol %, at least 30 vol %, at least 35 vol %, at least 40 vol %, at least 45 vol %, at least 50 vol %, at least 55 vol %, at least 60 vol %, at least 65 vol %, at least 70 vol %, at least 75 vol %, or at least 80 vol % for a total volume of the ion conductive layer. In another instance, the porosity can be at most 80 vol % for a total volume of the porous layer, such as at most 75 vol %, at most 70 vol %, at most 65 vol %, at most 60 vol %, at most 55 vol %, at most 50 vol %, at most 45 vol %, at most 40 vol %, at most 35 vol %, at most 30 vol %, at most 25 vol %, at most 20 vol %, at most 15 vol %, or at most 10 vol % for a total volume of the ion conductive layer. Moreover, the ion conductive layer can include a porosity in a range including any of the minimum and maximum percentages noted herein.

In an aspect, the ion conductive layer can include closed pores, open pores, such as interconnected pores, or any combination thereof. For example, the majority of the pores can include open porosity. For instance, at least 60% of the porosity can include open pores, such as at least 70%, at least 80%, or at least 90% of the porosity can include open pores. In a particular instance, 95% of the porosity or essentially all of the pores can be open pores.

In another aspect, the ion conductive layer can include at least 20 vol % of open pores for the total volume of the ion conductive layer, such as at least 25 vol %, at least 28 vol %, at least 30 vol %, at least 35 vol %, at least 40 vol %, at least 45 vol %, at least 50 vol %, at least 55 vol %, at least 60 vol %, at least 65 vol %, at least 70 vol %, at least 75 vol %, or at least 80 vol % for a total volume of the ion conductive layer. In another instance, the open pores can be in a content of at most 90 vol % for a total volume of the ion conductive layer, such as at most 75 vol %, at most 70 vol %, at most 65 vol %, at most 60 vol %, at most 55 vol %, at most 50 vol %, at most 45 vol %, at most 40 vol %, at most 35 vol %, at most 30 vol %, at most 25 vol %, at most 20 vol %, at most 15 vol %, or at most 10 vol % for a total volume of the ion conductive layer. Moreover, the ion conductive layer can include a content of open pores in a range including any of the minimum and maximum percentages noted herein.

In another aspect, the ion conductive layer can include closed pores. For instance, at least 60% of the porosity can include closed pores, such as at least 70%, at least 80%, or at least 90% of the porosity can include closed pores. In a particular example, 95% of the porosity or essentially all of the pores can be closed pores.

In a further aspect, the ion conductive layer can include at most 50 vol % of closed pores, such as at most 40 vol % at most 30 vol %, at most 20 vol %, at most 10 vol %, or at most 5 vol % of closed pores for a total volume of the ion conductive layer. In another instance, the closed pores can be in a content of at least 0.5 vol %, at least 1 vol %, at least 2 vol %, at least 3 vol %, at least 4 vol %, or at least 5 vol % for a total volume of the ion conductive layer. Moreover, the ion conductive layer can include a content of closed pores in a range including any of the minimum and maximum percentages noted herein.

In an embodiment, the ion conductive layer can include one or more pore characteristics including, but not limited to, a particular average pore size, a particular pore size distribution, such as $D_{10}$, $D_{50}$, and/or $D_{90}$, a particular pore shape, a particular length, a particular width, a particular average aspect ratio, a particular pore distribution, a particular porosity, a particular open porosity, a particular closed porosity, or any combination thereof. The one or more particular pore characteristics in combination with one or more other features of the ion conductive layer are expected to improve formation and performance of the ion conductive layer.

In particular implementations, the ion conductive layer can be a porous layer. In an embodiment, the ion conductive layer can include pores having a particular shape that can facilitate improved formation and performance of the ion conductive layer. In an aspect, the ion conductive layer can include elongated pores. For example, pores can include tortuous pores, acicular pores, rod-shaped pores, needle-shaped pores, polygonal cylindrical pores, or any combination thereof. In a particular example, pores can have an elongated shape and a polygonal cross-section. In another particular example, pores can include needle-shaped pores and at least some of the needle-shaped pores can be connected. In another aspect, the ion conductive layer can include spherical pores, cubic pores, polyhedron-shaped pores, such as octahedron-shaped pores, hexahedron pores, pores having a 3-dimensional structure, or any combination thereof. In particular instances, the ion conductive layer can include pores including octahedron-shaped pores, cubic pores, needle-shaped pores, rod-shaped pores, or any combination thereof.

In a further aspect, the solid ion conductive layer can include pores having a particular average aspect ratio of length:width. In an example, the average aspect ratio can be at least 1 or greater than 1, such as at least 1.2, at least 1.5, at least 2, at least 2.3, at least 2.5, at least 2.8, or at least 3. In another example, the average aspect ratio can be at most 30, at most 25, at most 22, at most 20, at most 15, at most 12, at most 10, at most 8, at most 5, or at most 4. Moreover, the pores can have an aspect ratio in a range including any of the minimum and maximum values noted herein.

Figure 3:
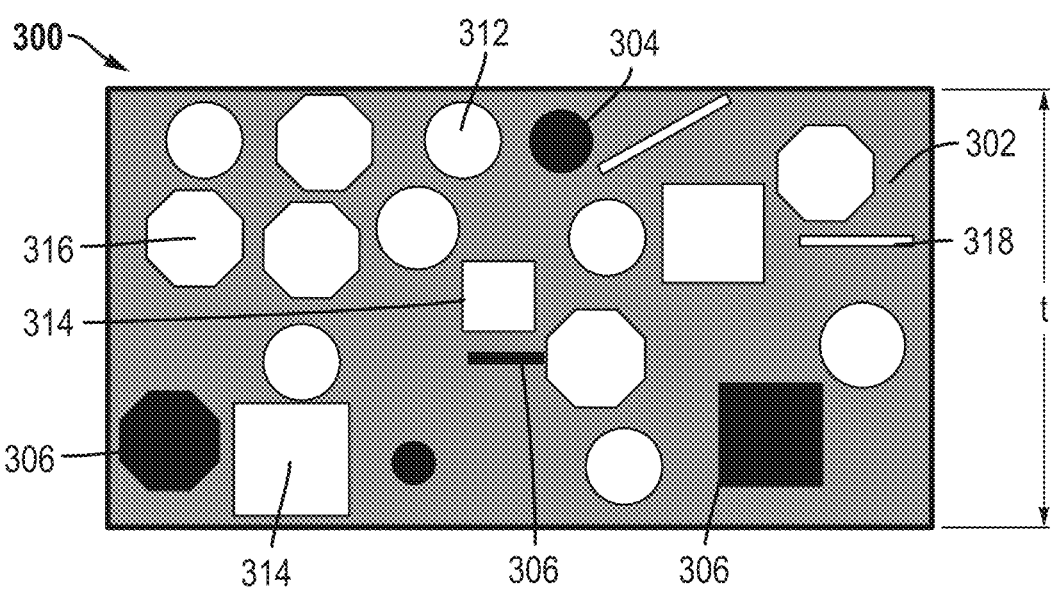
FIG. 3 includes a cross-sectional illustration of an ion conductive layer in accordance with another embodiment herein.

Referring to FIG. 3, an exemplary ion conductive layer 300 can include the ion conductive material 302, organic material 304, and ammonium halide 306. The ion conductive layer further includes pores 312, 314, 316, and 318. Pores 312 can be spherical. Pores 314 can be cubic. Pores 316 can be octahedron-shaped. Pores 318 can be elongated. As described in embodiments herein, elongated pores are intended to refer to pores having an aspect ratio greater than 1. In an example, the ion conductive layer 300 can have pores having different shapes than pores 312 to 318. In another example, the ion conductive layer 300 can have pores having substantially the same shape, such as the shape of any of pores 312 to 318. In another example, the ion conductive layer 300 may include pores having shapes of any two or three of pores 312 to 318. In a further example, the ion conductive layer 300 can be essentially free of any of pores 312 to 318. In a particular instance, the ion conductive layer 300 can be essentially free of the organic material 304. In another particular instance, the ion conductive layer can be essentially free of ammonium halide 306. In a further instance, the ion conductive material can include ammonium halide doped halide material.

FIG. 4A includes an illustration of a cross-section of an exemplary ion conductive layer 400 including the ion conductive material 402 and pores 404. As illustrated, within the bulk of the ion conductive layer 400, the ion conductive material 402 can be in the shape of flakes, and elongated pores 404 can extend between flakes 402. The pores 404 can have an elongated shape, and the elongation direction can extend horizontally, such as along the plane of the cross-section, vertically, such as toward the plane of the cross-section, and/or in a direction that forms an acute or obtuse angle with the plane of the cross-section. In a particular example, pores 404 can have a cylindrical shape having a polygonal cross-section. In another particular example, at least some of the pores 404 can be interconnected extending 3-dimensionally through at least a portion of the bulk of the ion conductive layer 400. In another particular example, at least some of the flakes 402 can form an interconnecting network, wherein at least some flakes are separated by the elongated pore 404 extending through at least a portion of the network. In a more particular example, the bulk of the ion conductive layer 400 can include a network of interconnecting flakes 402, wherein elongated pores 404 can extend between flakes 402. In another more particular example, the interconnecting flakes 402 can be bonded to one another. In particular implementations, the ion conductive layer 400 may be a scaffold or a frame for forming a composite layer having an ion conductivity and electron conductivity.

FIG. 4B includes an illustration of an exemplary pore 404 in the ion conductive layer 400. The pore 414 can be defined by a plurality of flakes 412 and have a cross-section of polygon, such as a triangle. As illustrated in FIG. 4B, the pore 404 can extend vertically. In a particular example, the pore 404 can extend in the direction that is substantially perpendicular to a major surface of the ion conductive layer. Referring to FIG. 3, a major surface can be any of the top and bottom surfaces the thickness t extends there between.

Figure 14:
FIG. 14 includes a SEM image of a portion of a cross-section of another exemplary solid ion conductive layer according to an embodiment.

FIG. 14 includes a SEM image of a portion of a cross-section of an exemplary solid ion conductive layer 1400 cast on a substrate 1410 according to another embodiment. The solid ion conductive layer 1400 includes an organic binder material 1401, a solid ion conductive material 1402 in the shape of flake or sheet, and pores including pores 1403 and 1404. Pores may be defined at least partially by the solid ion conductive material 1402. For example, pores 1403 may be defined by the organic binder material 1401 and the solid ion conductive material 1402. At least some other pores, such as pores 1404, may be defined by the solid ion conductive material 1402.

In an embodiment, the ion conductive layer 400 can include elongated pores having an orientation at the elongation direction that forms a particular angle with one of the major surfaces. For example, at least 30% or at least 40% or at least 50% or at least 60% or at least 70% of the elongated pores are oriented within at most ±30 degree, within at most ±20 degrees, within at most ±10 degrees, or within at most ±5 degrees of a right angle formed by the pore elongation direction and the top major surface or the bottom major surface of the ion conductive layer.

In an embodiment, the elongated pores 404 can have a particular width, a particular length, or a combination thereof. In an aspect, the width of the elongated pores can be at least 0.1 µm, at least 0.3 µm, at least 0.5 µm, at least 0.8 µm, at least 1 µm, at least 1.5 µm, or at least 2 µm. In another aspect, the width can be at most 20 µm, at most 15 µm, at most 10 µm, at most 8 µm, at most 5 µm, at most 4.5 µm, at most 4 µm, at most 3.5 µm, at most 3 µm, or at least 2.5 µm. Moreover, the width can be in a range including any of the minimum and maximum values noted herein. Using the triangle cross-section as an example, the width can be the greatest height of the triangle. For a square or rectangle cross-section, the width can be the length of the square or rectangle. For polygonal cross-section having more than 4 sides, the width can be the largest diagonal distance of the polygon.

In a further aspect, the elongated pores can have a length of at least 0.5 µm, at least 0.8 µm, at least 1 µm, at least 2 µm, at least 5 µm, at least 8 µm, at least 10 µm, at least 15 µm, at least 20 µm, at least 30 µm, at least 40 µm, at least 50 µm, or at least 60 µm. In another aspect, the length of the elongated pores can be at most 100 µm, such as at most 90 µm, at most 80 µm, at most 70 µm, most 60 µm, at most 50 µm, or at most 40 µm. Moreover, the elongated pores can have a length in a range including any of the minimum and maximum values noted herein. As noted herein, the width and length of elongated pores are intended to be an average value of width and length of at least 100 elongated pores, respectively.

In another embodiment, the ion conductive layer can include pores having a particular tortuosity that can facilitate improved formation and performance of the ion conductive layer. In a particular aspect, the tortuosity of the porous tape (normal to major surface) is at most 1.2, or at most 1.5, or at most 2, or at most 3. As used herein, tortuosity, τ, can be defined by the below formula, wherein $L_t$ is the average length of the geometric flow paths through the porous layer, and L is the thickness of the porous layer.

$$\tau = \frac{L_t}{L}$$

Tortuosity can be determined by using 3D geometry measurement. 3D geometry can be obtained by focused ion-beams-scanning electron microscopy (FIB-SEM) method or micro-computed tomography (micro-CT), or nano-computed tomography (nano-CT). $L_t$, average length of the geometric flow paths through the porous layer, can be obtained by measuring the lengths of the center line of the connected pores in a representative region and average them.

Tortuosity can also be determined by using effective binary diffusivity. Effective binary diffusivity of substances A and B through a porous layer, $D_{A-B}^{eff}$, can be tested through gas diffusivity measurement. $D_{A-B}^{eff}$ can be expressed as follow:

$$D_{A-B}^{eff} = \frac{V_V}{\tau^2} D_{A-B}$$

where $V_V$ is the volume percentage of porosity, r is tortuosity, $D_{A-B}$ is the binary diffusivity of A and B (which is independent to the porous structure). $D_{A-B}$ can be obtained by Chapman-Enskogg model:

$$D_{H2-H2O} = \frac{0.00186 T^{\frac{3}{2}} \left( (1/M_A) + (1/M_B) \right)^{1/2}}{p \Omega \sigma_{A-B}^2}$$

where $M_A$ and $M_B$ are the molecular weights of A and B, p is the total pressure, Ω is the collision integral, and $\sigma_{A-B}$ is the collision diameter.

In an embodiment, the ion conductive layer can include flakes 404 having a particular thickness that can facilitate improved formation and performance of the ion conductive layer. In an aspect, the flake 404 can have thickness of at least 0.1 µm, at least 0.3 µm, at least 0.5 µm, at least 0.8 µm, at least 1 µm, at least 2 µm, at least 4 µm, or at least 5 µm. In another aspect, the flake 404 can have a thickness of at most 20 µm, at most 18 µm, at most 15 µm, at most 12 µm, at most 10 µm, at most 9 µm, at most 8 µm, at most 6 µm, or at most 5 µm. Moreover, the flake 404 can include a thickness in a range including any of the minimum and maximum values noted herein. As used herein, the thickness is intended to refer to an average thickness of at least 20 flakes.

Referring to FIG. 5, an exemplary ion conductive layer 500 can include the ion conductive material 502, the organic material 504, ammonium halide 508, and pores 506.

In an embodiment, the ion conductive layer can include a particular average pore size, $D_{50}$. For instance, the ion conductive layer can include a $D_{50}$ of at least 50 nm, at least 80 nm, at least 100 nm, at least 200 nm, at least 300 nm, at least 400 nm, at least 500 nm, at least 600 nm, at least 700 nm, at least 800 nm, at least 900 nm, at least 1 microns, at least 2 microns, at least 3 microns, at least 5 microns, at least 10 microns, at least 30 microns, at least 50 microns, at least 100 microns, or at least 200 microns. In another instance, the ion conductive layer can include a $D_{50}$ of at most 300 microns, such as at most 200 microns, at most 150 microns, at most 100 microns, at most 80 microns, at most 70 microns, at most 65 microns, such as at most 60 microns, at most 55 microns, at most 50 microns, at most 40 microns, at most 30 microns, at most 10 microns, at most 5 microns, at most 3 microns, or at most 1 micron. Moreover, the ion conductive layer can include a $D_{50}$ in a range including any of the minimum and maximum values noted herein. In exemplary particular implementations, $D_{50}$ may be in a range from 100 nm to 50 microns. In another particular example, $D_{50}$ can be in a range from 0.5 microns to 5 microns. For pores having a substantially spherical shape, pore size can refer to the diameter of the pore in a cross-section. For pores having a non-spherical shape, pore size can refer to the largest dimension, such as the length, of the pore in a cross-section.

In this disclosure, the average pore size can be measured using ASTM standard E112 Standard Test Methods for Determining Average Grain Size. Cross-sectional images of the body were viewed at 60× magnification on a Hitachi Microscope. The macro to determine pore length follows a technique to measure crystal size based on including drawing six equally spaced lines on the image and determining the regions of the line that intersect with a pore. The regions of the lines that intersect the pore are measured. This process was repeated for seven different images of portions of the bonded abrasive body. After all images were analyzed the values were averaged to calculate the average pore size. Moreover, it will be appreciated that reference to the average pore size can also refer to a mean pore size.

Turning briefly to FIG. 3, as illustrated, pores 312 can be substantially spherical. In a particular instance, pores 312, may be resulted from removal of the organic material in the process of forming the solid ion conductive layer. In another particular instance, pores 314 to 318 illustrated in FIG. 3 and pores 404 illustrated in FIGS. 4A and 4B may be resulted from removal of ammonium halide in the process of forming the ion conductive layer. In another embodiment, pores resulted from sublimation of ammonium halide may have spherical shapes, irregular shapes, or another shape.

In an embodiment, the solid ion conductive layer can include a first type of porosity and a second type of porosity, wherein the first and second types of porosity can include one or more different pore characteristics including pore shapes, pores sizes, pore size distributions, pore structures, aspect ratio, or any combination thereof. In a particular aspect, the first type of porosity can include pores having a non-spherical shape. In another particular aspect, the first type of porosity can include pores resulted from removal of ammonium halide. For example, the first type of pores can include pores 404 illustrated in FIGS. 4A and 4B, pores 314, pores 316, pores 318 illustrated in FIG. 3, or a combination thereof. In particular instances, the first type of porosity can consist essentially of pores 404 illustrated in FIGS. 4A and 4B. In another aspect, the second type of porosity can include spherical pores, such as pores 312 illustrated in FIG. 3. In another aspect, the second type of porosity can include pores formed by removal of the organic material.

In an embodiment, the solid ion conductive layer can include a particular content of the first type of porosity that can facilitate improved formation and function of the solid ion conductive layer. In an aspect, the first type of porosity can make up at least 10 vol % for the total volume of the ion conductive layer, at least 15 vol %, at least 20 vol %, at least 25 vol %, at least 30 vol %, at least 40 vol %, at least 50 vol %, at least 55 vol %, at least 60 vol %, at least 70 vol %, at least 80 vol %, or at least 90 vol % for the total volume of the ion conductive layer. In a further aspect, the first type of porosity can make up at most 95 vol % for the total volume of the ion conductive layer, at most 90 vol %, at most 80 vol %, at most 70 vol %, at most 60 vol %, at most 50 vol %, at most 40 vol %, at most 30 vol %, or at most 20 vol % for the total volume of the ion conductive layer. In a particular aspect, the solid ion conductive layer can include a content of the first type of porosity in a range including any of the minimum and maximum percentages noted herein.

In a further aspect, the first type of porosity can include open pores, closed pores, or a combination thereof. In another particular aspect, the first type of porosity can consist essentially of open pores. In another aspect, the first type of porosity can have an average pore size including any values noted in embodiments herein with respect to average pore size.

In another instance, the solid ion conductive layer can consist essentially of the second type of porosity including pores 312, pores having irregular shapes, or both. In a particular instance, the second type of porosity may consist essentially of spherical pores, irregularly-shaped pores, or a combination thereof. Referring to FIGS. 4 and 5, the solid ion conductive layer 400 and 500 include spherical pores 406 and 506, respectively.

In a further aspect, the second type of porosity can include open pores, closed pores, or a combination thereof. In an example, a majority of the second type of porosity of pores can include open pores, and more particularly the second type of porosity can consist essentially of open pores. In another example, a majority of the second type of porosity of pores can include closed pores, and more particularly the second type of porosity can consist essentially of closed pores. In another aspect, the first type of porosity can have an average pore size including any values noted in embodiments herein with respect to average pore size.

In another aspect, the solid ion conductive layer can include interconnected pores including elongated pores connected to one another. In a further aspect, the solid ion conductive layer can include interconnected pores including elongated pores connected to pores having another shape, such as spherical pores.

In an embodiment, the solid ion conductive layer can include a first phase including the ion conductive material and a second phase including the organic material. The first phase can extend continuously for at least a portion of the solid ion conductive layer. In a particular instance, the first phase can extend through the thickness of the solid ion conductive layer. In a particular embodiment, the solid ion conductive layer can include a plurality of first phases extending for at least a portion of the solid ion conductive layer, wherein at least some of the plurality of first phases can be isolated from one another. In another embodiment, the solid ion conductive layer can include heterogeneous phases including a phase including the ion conductive material and a phase including the organic material.

In an embodiment, a multi-layer structure can include a plurality of ion conductive layers, wherein at least some of the plurality of ion conductive layers can include any of the features described in embodiments herein. In an embodiment, the plurality of ion conductive layers may include the same or different characteristics. For instance, the plurality of ion conductive layers may be different from each other by at least one characteristics including the type and/or content of the ion conductive material, density, porosity, the type and/or content of the organic material, or any combination thereof. In another instance, the plurality of ion conductive layers may include the same lithium-ion conductive material but different density or porosity. In a particular instance, the multi-layer structure can include a first dense ion conductive layer and a second porous ion conductive layer. In particular instances, the porous ion conductive layer can be 3-dimensionally structured.

Figure 6:
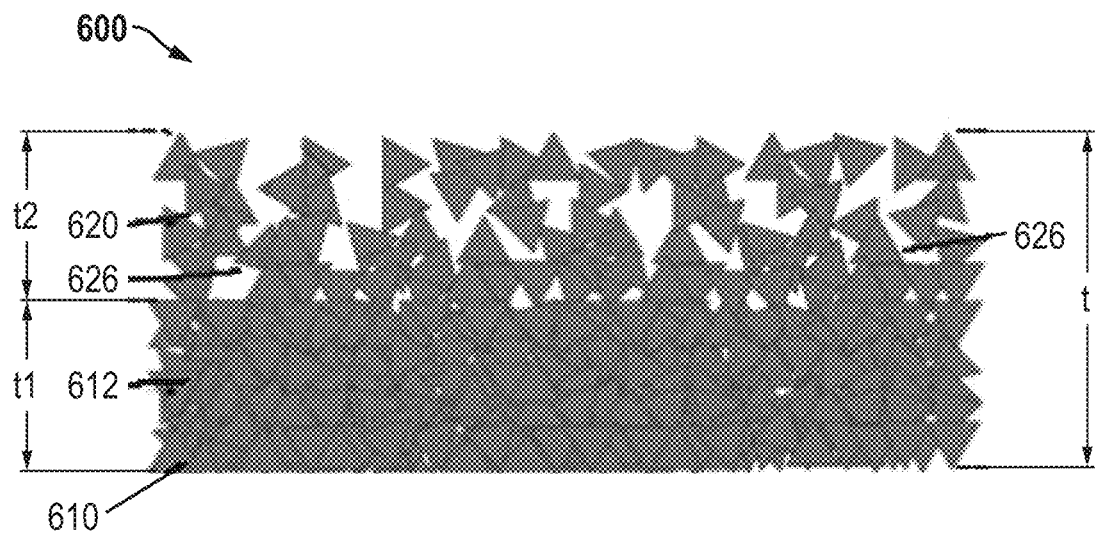
FIG. 6 includes a cross-sectional illustration of an ion conductive layer including sublayers in accordance with an embodiment herein.

FIG. 6 includes a cross-sectional illustration of an exemplary multi-layer structure 600 in accordance with a particular embodiment, including a dense ion conductive layer 610 and a porous ion conductive layer 620 having a 3-dimensional structure. The layer 610 can include an ion conductive material 612, such as a halide lithium conductive material, or in a particular instance, a lithium conductive material represented by Formula 1. The layer 620 can include a same or different ion conductive material 622 and pores 626. In another instance, the sublayer 620 may include ammonium halide, the organic material, or a combination thereof. In a particular instance, the layer 620 may include ammonium halide at a content noted in embodiments herein. In an exemplary application, the dense layer 610 may be an electrolyte and the porous layer 620 may be a scaffold or a backbone structure for an electrode layer for a solid state lithium battery.

In an embodiment, the ion conductive layer can be a composite layer, such as having mixed ion conductivity and electron conductivity. In an aspect, the composite layer can include an electron conductive material. In an example, the electron conductive material may include an active electrode material, an electron conductive additive, or a combination thereof. In particular instances, the electrode material can include an active cathode material. Exemplary cathode materials can include lithium-containing oxide, transition metal fluorides, polyanion materials, fluorinated polyanion materials, transition metal sulfides, transition metal oxyfluorides, transition metal oxysulfides, transition metal oxynitrides, or any combination thereof. Particular exemplary cathode material may include $LiCoO_2$, $LiFePO_4$, $Li(NiCoAl)O_2$, $LiCoO_2$, $LiMnPO_4$, $LiMn_2O_4$, $LiNi_{1/3}Co_{1/3}Mn_{1/3}O_2$, or any combination thereof. In another particular instance, a composite layer can include a metallic coating disposed over the ion conductive layer. The metallic coating can include an active anode material, such as lithium or lithium alloy, graphite, carbon nanotubes, or any combination thereof.

Figure 7:
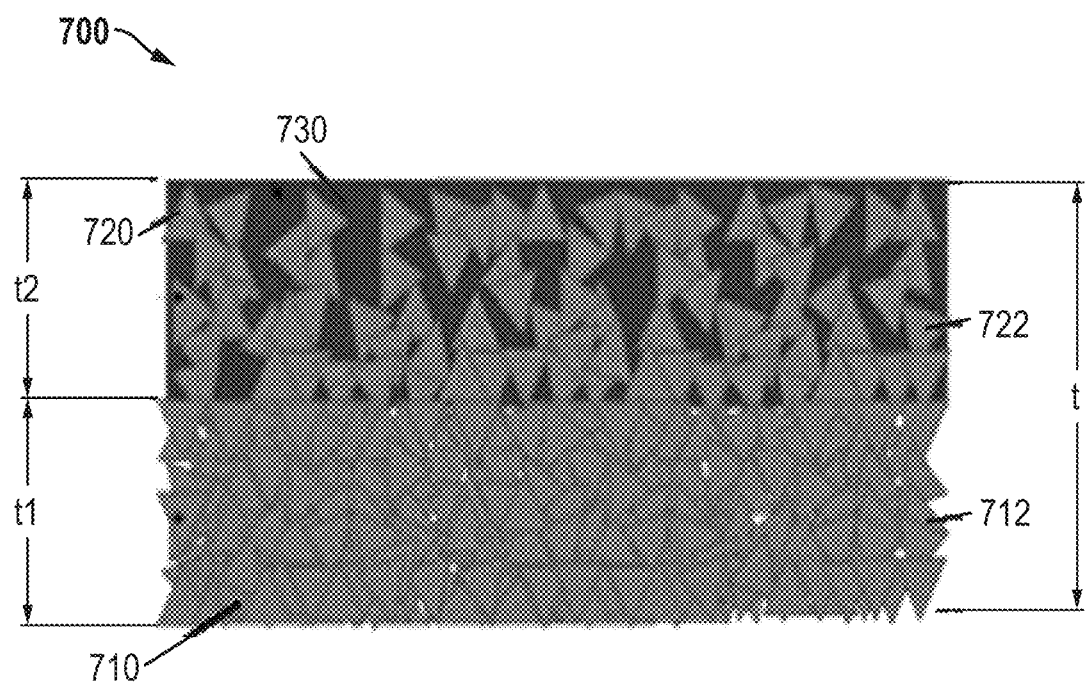
FIG. 7 includes a cross-sectional illustration of an ion conductive layer including sublayers in accordance with another embodiment herein.

In a particular embodiment, a multi-layer structure can include a first ion conductive layer and a second composite layer having mixed ion and electron conductivity. Referring to FIG. 7, an exemplary multi-layer structure 700 can include the ion conductive layer 710 including the ion conductive material 712 and a composite layer 720 including the ion conductive material 722 and electron conductive material 730. An exemplary electron conductive material can include lithium-containing transition metal oxide, such as $LiCoO_2$, $LiMn_2O_4$, or a combination thereof. In another particular example, the electron conductive material can include lithium metal or lithium-containing alloy. In an instance, the layer 720 may include ammonium halide, the organic material, or a combination thereof.

The layer 720 can overlie and be in direct contact with the sublayer 710. The ion conductive materials 712 and 722 may be the same or different.

In particular implementations, the layer 710 may be an electrolyte and the layer 720 may be a composite cathode layer including the ion conductive material and an active cathode material or a composite anode layer including the ion conductive material and an anode material. The multi-layer structure 700 may be a portion of an electrochemical device, such as a solid-state lithium battery.

In an embodiment, the ion conductive layer can have a particular thickness that can facilitate improved formation and performance of the ion conductive layer. Referring to FIGS. 1 to 7, the ion conductive layer can include a thickness t. In an example, the thickness "t" can be at most 1 mm, such as at most 800 microns, at most 600 microns, at most 400 microns, at most 200 microns, or at most 100 microns. In another instance, the thickness "t" can be at least 1 micron, such as at least 5 microns, or at least 10 microns. It is to be appreciated the ion conductive layer can have a thickness "t" in a range including any of the minimum and maximum values noted therein.

As illustrated in FIGS. 6 and 7, the layers 610 and 710 can have a thickness "t1", and the sublayers 620 and 720 can have a thickness "t2". The thickness "t1" and "t2" can include any thickness values noted in embodiments herein in relation to the thickness "t" of the ion conductive layer. In an aspect, the thickness "t2" may be at least the thickness "t1". For instance, the thickness "t2" may be at least 5 microns and at most 1 mm. In another aspect, the thickness "t1" may be in a range from 5 microns to 100 microns. In a further aspect, the thickness "t2" can be different than "t1". In still another aspect, the thickness "t2" may be at most the thickness "t1".

In an embodiment, the ion conductive material can include a particular ion conductivity that can facilitate improved performance of the ion conductive layer. In an aspect, the ion conductivity can be at least 0.1 mS/cm, such as at least 0.3 mS/cm, at least 0.5 mS/cm, at least 1 mS/cm, at least 1.2 mS/cm, at least 1.5 mS/cm, at least 1.7 mS/cm, or at least 1.9 mS/cm. In another aspect, the ion conductivity of at most at most 50 mS/cm, at most 40 mS/cm, at most 35 mS/cm, at most 30 mS/cm, at most 20 mS/cm, at most 15 mS/cm, at most 10 mS/cm, at most 8 mS/cm, at most 6 mS/cm, at most 5 mS/cm, at most 3 mS/cm, at most 2.8 mS/cm, at most 2.5 mS/cm, at most 2.2. mS/cm, or at most 2 mS/cm. Moreover, the ion conductivity can be in a range including any of the minimum and maximum values noted herein. The lithium ionic conductivity noted in embodiment herein can be determined at room temperature (i.e., 20° C. to 25° C.) and at activation energy in the range of 0.2 eV and 0.5 eV.

Figure 8:
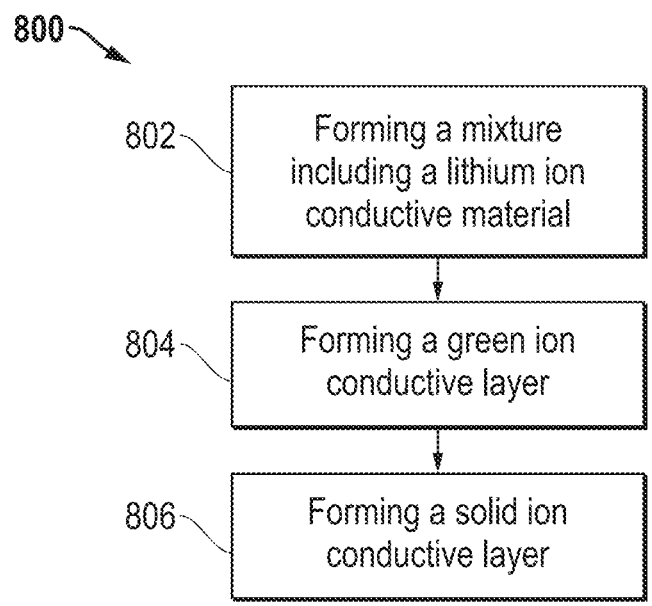
FIG. 8 includes an illustration of a process in accordance with an embodiment herein.

Referring to FIG. 8, a process of forming the ion conductive layer 800 can start at block 802, forming a mixture including the lithium-ion conductive material. In an aspect, the mixture may also include a solvent, a binder, and optionally, a dispersant, plasticizer, homogenizer, and/or a pore-forming material. The ingredients of the mixture may not react with the ion conductive material.

In some instances, the mixture may further include a lithium salt, an organic ion conductive material, and/or an electron conductive material, such as an active cathode material or an active anode material. By mixing the lithium-ion conductive material and electron conductive material, the reaction sites for charge transfer of lithium-ion and electron conduction can be improved, which can facilitate improved interfacial resistance and cyclability of the ion conductive layer (e.g., cathode and/or anode).

The ingredients may be added in any suitable order for forming a homogenous mixture, and a mixing aid, such as a mixer, may be used to facilitate mixing.

In an embodiment, the ion conductive material may be mixed with a solvent to form a suspension solution or a slurry. In a particular aspect, the solvent can have a HLB value, a Reactivity Value, or a combination thereof, as noted in embodiments herein. An exemplary solvent can include toluene, pentene, xylene, pentane, hexane, heptane, octane, nonane, decane, undecane, dodecane, cyclopentane, cyclohexane, cycloheptane, cyclooctane, cyclodecane, cycloundecane, cyclodocecane, dimethyl sulfide, dibromomethane, dichloromethane, o-chlorotoluene, o-dichlorobenzene, or any combination thereof.

One or more binders can be mixed in the slurry to facilitate improved formation and performance of the ion conductive layer. The binder can have an HLB value, a Reactivity Value, an MAR, or a combination thereof, as noted in embodiments herein. An exemplary binder can include one or more materials selected from the group consisting of paraffin wax, polypropylene carbonate, polyisobutylene, polyvinyl pyrrolidone, poly (methyl methacrylate), polyethylene glycol, hydrogenated nitrile butadiene rubber, styrene-butadiene rubber, high density polyethylene, low density polyethylene, polyurethane, poly(propylene oxide), polyvinyl chloride, poly(vinylidene fluoride), poly (acrylonitrile), poly(dimethysiloxane), poly[bis(methoxy ethoxyethoxide)-phosphazene], polyethylene carbonate, polypropylene glycol, polycaprolactone, and poly(trimethylene carbonate), poly(ethylene oxide), polystyrene, poly (methyl acrylate), poly(vinylidene fluoride)-co-hexafluoropropylene, poly(acrylonitrile-co-butadiene), poly(styrene-butadiene-styrene), and styrene-ethylene-butylene-styrene. Optional ingredients may be added to the mixture. In an embodiment, the mixture may be formed into a colloidal suspension.

In some implementations, a pore-forming material can be included in the mixture. In an embodiment, the pore-forming material can include an organic material, inorganic material, or a combination thereof. In a particular embodiment, the pore-forming material can include ammonium halide, such as $NH_4Br$, $NH_4Cl$, $NH_4I$, $NH_4F$, or a combination thereof. In implementations, ammonium halide can be sublimated to create pores in the ion conductive layer. In particular implementations, a pore-forming material can consist of ammonium halide. In an aspect, ammonium halide particles can have a shape similar to the pore shapes described in embodiments herein. In another aspect, ammonium halide may be complexed with the ion conductive material to create pores having a particular pore characteristic.

In another embodiment, a pore-forming material other than ammonium halide may be used. In particular implementations, evaporation of the pore-forming material can be conducted to create pores. Conventionally, pore formers, such as carbon black, graphite, poly(methyl methacrylate) (PMMA), starch, theobromine, and the like, are burned out in an oxidizing environment to create pores. Burning out an organic pore former can cause water vapor to be released, which can be an unsuitable process for the hygroscopic ion conductive material, because water vapor can cause degradation of a hygroscopic ion conductive material, such as a halide-based material. Degradation may result in formation of compounds and/or molecules with low ion conductivity. For example, degradation of a halide-based material caused by water vapor can result in the formation of compounds having poor ion conductivity, such as a hydrate of the halide-based material, simple metal halide, metal oxohalide, and $H_2$ and adversely affect ion conductivity of the hygroscopic ion conductive material. Further, a halide-based material can react with $O_2$ and form metal oxides and halogen that tend to have poor or little ionic conductivity.

In instances, evaporation of an organic pore-forming material may result in a derivative that can remain in the porous ion conductive layer, such as hydrocarbon, char, graphite, or any combination thereof. Such organic pore former may not be preferred for forming a porous ion conductive layer free of those derivatives.

In an embodiment, the mixture can include at least 1 wt % to at most 60 wt % of the organic material for the total weight of the mixture. In another embodiment, the mixture can include at least 1 wt % to at most 60 wt % of ammonium halide for the total weight of the mixture. In another embodiment, the mixture can include at least 20 wt % to at most 90 wt % of the ion conductive material for the total weight of the mixture. In still another embodiment, the mixture can include at least 2 wt % to at most 60 wt % of the solvent for the total weight of the mixture.

The process 800 may continue to block 804. In an example, forming a green layer can include treating the mixture by casting, coating, printing, binder jetting, extrusion, compacting, calendaring, pressing, or any combination thereof. In particular instances, the green layer can be in the form of a tape or film. The green layer may include any thickness noted in embodiments herein. In particular implementations, forming a green ionic conductive layer can include tape casting, such as doctor blading or knife coating. Tape casting may be performed in a dry condition, for example in a dry room or a glove box. In another particular implementation, the green layer may be formed by extruding the mixture to form a film or a tape. In particular instances, tape casting can be performed in a manner such that the green layer may include improved thickness having any values noted in embodiments herein. Improved thickness of the ion conductive layer can help improve ionic current resistance.

In another aspect, forming a green ionic conductive layer may include forming a plurality of green sublayers. For instance, a first green layer may be formed, and a second green layer may be formed overlying the first green layer. The first green layer can include the mixture. The second green layer may include an ion conductive material that can be the same or different from the ion conductive material in the mixture of block 802. In an exemplary implementation, tape casting may be used to form each green layer. In particular implementations, the green layers may be formed separately and then laminated. Alternatively, tape casting may be performed to form the green layers simultaneously. In particular implementations, roll-to-roll deposition may be performed to cast a stack of green layers simultaneously. In another example, additional green layers may be formed overlying the first and/or the second green layer. In another example, the plural layers can be co-extruded to form the multi-layer structure.

The process 800 can continue to block 806 to form the ion conductive layer. In an embodiment, forming the ion conductive layer from the green layer can include drying the green layer. Drying may be performed at room temperature or with the application of heat. In some instances, a dried layer may be a dense solid ion conductive layer.

In another embodiment, forming the ion conductive layer may include heating the green layer. In some instances, heating may be performed to a dried layer. In a further instance, heating the green layer may facilitate improved crystallinity and/or connectivity of the lithium-ion conductive material.

In an aspect, heating the green layer may include removing one or more binder material. In particular aspects, heating can include evaporating one or more binder material. Such binder material can include one or more material selected from the group consisting of paraffin wax, polypropylene carbonate, polyisobutylene, polyvinyl pyrrolidone, poly (methyl methacrylate), polyethylene glycol, poly (ethylene oxide), polyvinyl chloride, poly(acrylonitrile), polyethylene carbonate, or a combination thereof. In a further instance, removing the binder material can be performed without producing a moisture molecule, such as water. In particular instances, heating can include a heating temperature and/or a heating time that can facilitate the formation of a porous ion conductive layer having one or more particular pore structure characteristics. An exemplary heating temperature can include the evaporation temperature of the binder material. In another instance, the heating temperature can include from 30° C. to 400° C. In a further instance, the heating time can be from two minutes to 24 hours. A porous ion conductive layer may be formed after removal of the binder material.

In another aspect, heating the green layer may be performed at a temperature that can facilitate formation of a dense ion conductive layer. In some instances, heating can be performed to remove a binder material and at the same time to soften the ion conductive material so that under relatively low pressure, a dense ion conductive layer can be formed. In particular instances applying pressure to the green layer can be performed during heating the green layer. For example, evaporating a binder material may be performed simultaneously with applying pressure to the green layer. In another instance, the pressure may be from 0.1 MPa to 100 MPa.

In another aspect, heating the green layer may include sublimating ammonium halide. In some instances, the green layer may be heated at a temperature that can facilitate sublimation of ammonium halide and formation of a porous ion conductive material. For example, sublimation of $NH_4Br$ can be preformed by heating the green layer to above 396° C. Sublimation of $NH_4Cl$ can be performed by heating the green layer to above 338° C.

In another aspect, heating the green layer may be performed to evaporate a binder material and sublimate a pore-forming material to form a porous ion conductive layer. For another example, polyisobutylene can be heated to 260° C. under nitrogen to be evaporated.

In particular instances, heating the green layer can be performed in a controlled manner such that an intermediate product that can react with the lithium-ion conductive material may not be formed. For example, the heating temperature may be controlled to avoid burning out the one or more binder to help prevent formation of $H_2O$. In another aspect, heating can be conducted to allow formation of pores and help avoid formation of a hydrated phase of the ion conductive material that defines the pores. For example, at least at least 90 wt %, or at least 95 wt %, or at least 99 wt % of the ion conductive material for the total weight of the ion conductive material is free of a hydrated phase. In another example, at most 10w %, or at most 5 wt %, or at most 1 wt % of the ion conductive material for the total weight of the ion conductive material can include a hydrated phase. Moreover, the ion conductive material can include a hydrated phase in a content including any of the minimum and maximum percentages noted herein. In a particular example, the ion conductive material may be essentially free of a hydrated phase.

Figure 9:
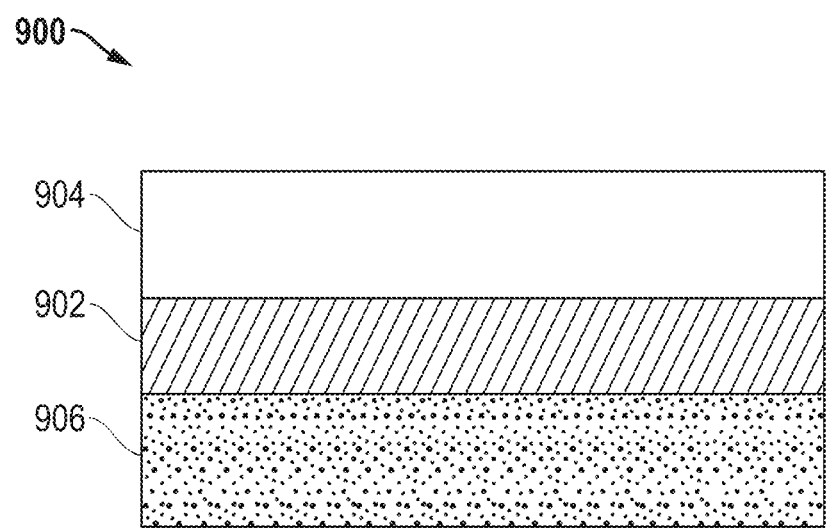
FIG. 9 includes a cross-sectional illustration of an electrochemical unit in accordance with an embodiment herein.

FIG. 9 includes an illustration of a cross-sectional view of an electrochemical unit 900 including an electrolyte 902 disposed between an anode 904 and cathode 906. In an embodiment, the electrolyte 902 can include the ion conductive layer noted in embodiments herein. The anode 904 may be a porous layer including a lithium-containing anode material. In particular instances, the anode 904 may consist of lithium. The cathode 906 may be a porous layer including a cathode material. In an exemplary implementation, the electrolyte 902, the anode 904, and cathode 906 may be formed by tape casting separately and laminated via a pressing process, such as uniaxial pressing, to form the electrochemical unit 900. In another exemplary implementation, a green multi-layer structure including the electrolyte 902, the anode 904, and the cathode 906 may be formed by using simultaneous-multilayer roll-to-roll techniques. In another embodiment, at least one or two or each of the electrolyte 902, the anode 904, and the cathode 906 can include the ion conductive layer noted in embodiments herein.

Figure 10:
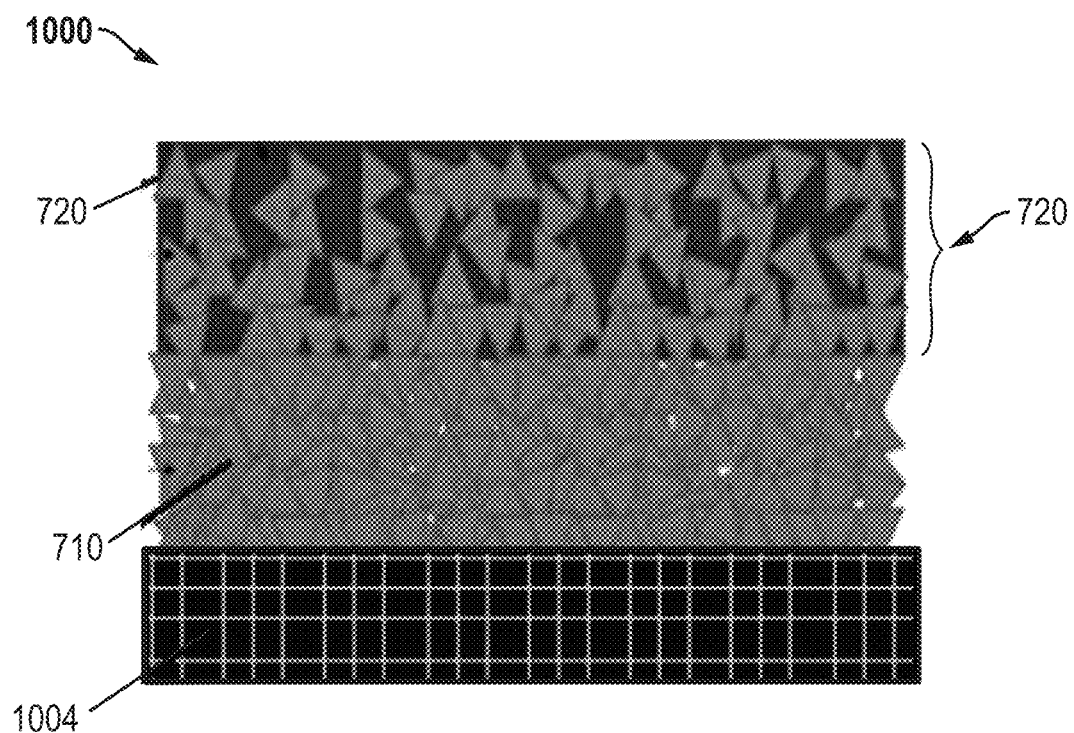
FIG. 10 includes a cross-sectional illustration of an electrochemical unit in accordance with another embodiment herein.

FIG. 10 includes a cross-sectional illustration of an electrochemical unit 1000 including the multi-layer structure 700 illustrated in FIG. 7 and an anode 1004. The layer 710 may be the electrolyte and the layer 720 may be the cathode of the electrochemical unit 1000. In exemplary implementation, the components of the electrochemical unit may be formed separately, such as by tape casting, and laminated to form the final electrochemical unit. In other implementations, simultaneously casting the green layers to form a green unit may be utilized.

Figure 11:
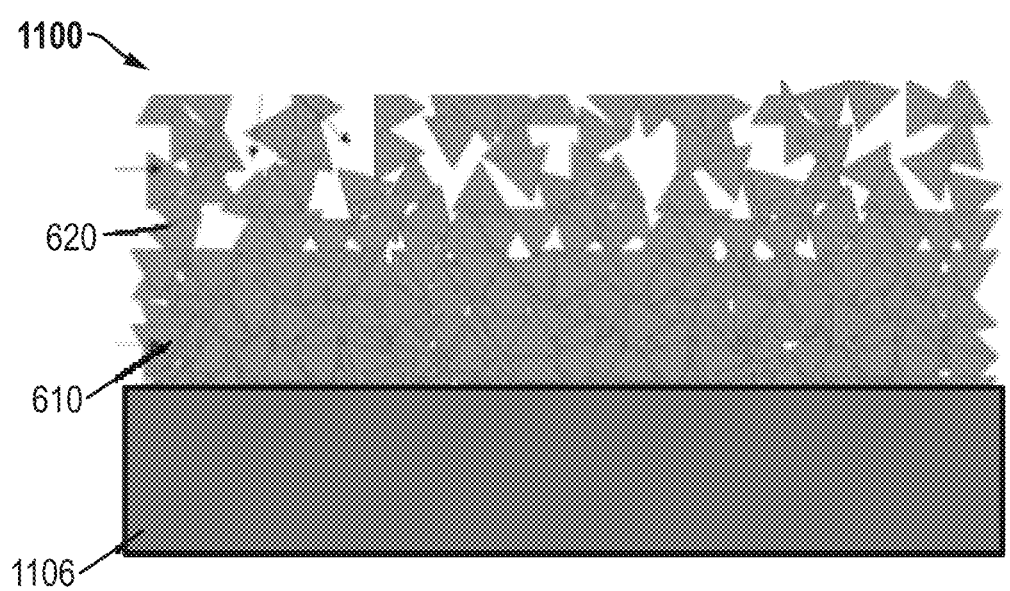
FIG. 11 includes a cross-sectional illustration of a multi-layer structure in accordance with an embodiment herein.

FIG. 11 includes a cross-sectional illustration of a multi-layer structure 1100 including the ion conductive layer 600 illustrated in FIG. 6 and a cathode 1106. The layers of the multilayer structure may be formed separately and laminated to form the multilayer structure. Alternatively, the green multi-layer structure may be formed by simultaneously casting a stack of green layers and dried and/or heated to form the multilayer structure.

Figure 12:
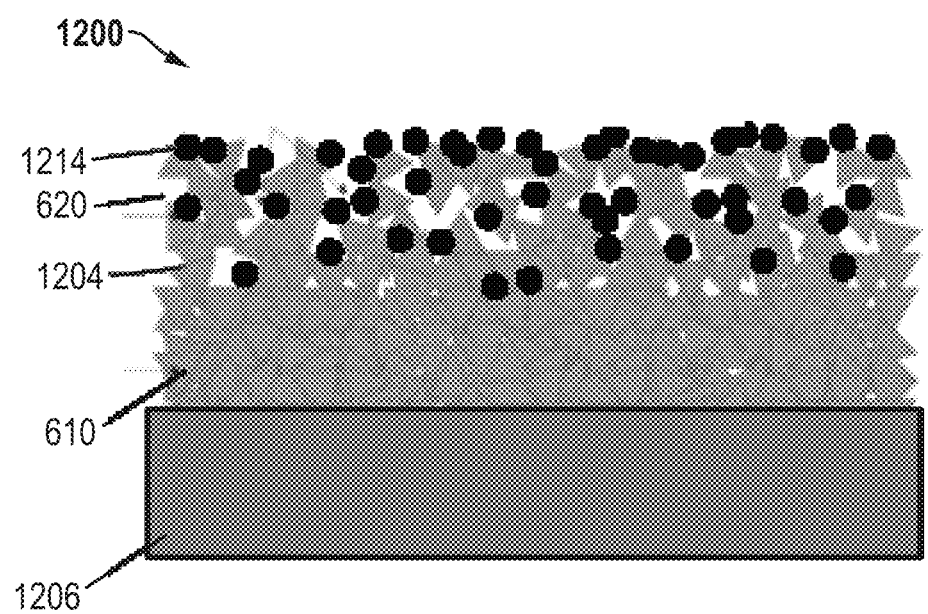
FIG. 12 includes a cross-sectional illustration of an electrochemical unit in accordance with another embodiment herein.

In an exemplary implementation, an anode material may be disposed over the layer 620 to form an electrochemical unit 1200 including a three-dimensionally structured anode 1204, an electrolyte 610, and a cathode 1206, as illustrated in FIG. 12. The anode 1204 can include the layer 620 and the anode material 1214.

In an embodiment, the solid ion conductive layer can include an ion conductivity of at least 0.05 mS/cm, at least 0.08 mS/cm, at least 0.10 mS/cm, at least 0.15 mS/cm, at least 0.18 mS/cm, at least 0.2 mS/cm, at least 0.25 mS/cm, at least 0.28 mS/cm, at least 0.3 mS/cm, at least 0.34 mS/cm, at least 0.38 mS/cm, at least 0.4 mS/cm, at least 0.5 mS/cm, or at least 0.6 mS/cm. In another embodiment, the solid ion conductive layer can include a ion conductivity of at most 25 mS/cm, at most 22 mS/cm, at most 20 mS/cm, at most 18 mS/cm, at most 16 mS/cm, at most 13 mS/cm, at most 10 mS/cm, at most 9 mS/cm, at most 7 mS/cm, at most 6 mS/cm, at most 5 mS/cm, at most 3 mS/cm, at most 2 mS/cm, or at most 1 mS/cm. Moreover, the solid ion conductive layer can include an ion conductivity in a range including any of the minimum and maximum values noted herein.

The ion conductivity of the ion conductive layer can be measured as follows. 15 mm samples can be punched out of the ion conductive layer and placed into a Teflon die with stainless steel plungers in order to measure conductivity. The samples can be compressed under 10 MPa of pressure and the resistance across the sample can be measured through an impedance measurement. Once the test is completed, the sample can be removed and the thickness can be measured. The conductivity can be calculated using the formula below:

$$\text{Conductivity} = \frac{\frac{\text{Thickness}}{\text{Area}}}{\text{Resistance}}$$

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A solid ion conductive layer, comprising: an ion conductive material comprising a hygroscopic material; a porosity of at least 10 vol % for a total volume of the ion conductive layer; and a content of residual $NH_4X$, wherein X comprises a halogen.

Embodiment 2. A solid ion conductive layer, comprising: an ion conductive material comprising a hygroscopic material; and within a bulk of the solid ion conductive layer at least one elongated pore extending between a plurality of flakes, wherein the plurality of flakes comprise the hygroscopic material.

Embodiment 3. A solid ion conductive layer, comprising: a first phase extending continuously for at least a portion of the solid ion conductive layer, wherein the first phase comprises an ion conductive material comprising a hygroscopic material; and a second phase comprising an organic material comprising: an HLB value of at most 10, a Reactivity Value of at most 20%, a Moisture Absorption Rate of at most 1 wt %; or any combination thereof.

Embodiment 4. A method, comprising forming a green layer comprising a mixture, wherein the mixture comprises: an ion conductive material in a content of at least 50 wt % for a total weight of the mixture, wherein the ion conductive material comprises a hygroscopic material; and at least one of a binder material or NH4X, wherein X comprises a halogen, wherein the binder material comprises: an HLB value of at most 10, a Reactivity Value of at most 20%, a Moisture Absorption Rate of at most 1 wt %; or 0 any combination thereof.

Embodiment 5. The solid ion conductive layer of any one of embodiments 1 to 3, comprising a thickness of at most 1 mm, at most 800 microns, at most 600 microns, at most 400 microns, at most 200 microns, or at most 100 microns.

Embodiment 6. The solid ion conductive layer of any one of embodiments 1 to 3, comprising a thickness of at most 100 microns.

Embodiment 7. The solid ion conductive layer of any one of embodiments 1 to 3, comprising a thickness of at least 1 micron, at least 5 microns, or at least 10 microns.

Embodiment 8. The solid ion conductive layer of any one of embodiments 1 to 3, wherein the ion conductive material is at least 50 vol % for a total volume of the solid ion conductive layer and at most 90 vol % for a total volume of the solid ion conductive layer.

Embodiment 9. The solid ion conductive layer of any one of embodiments 1 to 3, wherein the solid ion conductive layer comprises elongated pores having a width of at least 0.1 µm, at least 0.3 µm, at least 0.5 µm, at least 0.8 µm, at least 1 µm, at least 1.5 µm, or at least 2 µm.

Embodiment 10. The solid ion conductive layer of embodiment 9, wherein the width can be at most 20 µm, at most 15 µm, at most 10 µm, at most 8 µm, at most 5 µm, at most 4.5 µm, at most 4 µm, at most 3.5 µm, at most 3 µm, or at least 2.5 µm.

Embodiment 11. The solid ion conductive layer of embodiment 9 or 10, wherein the elongated pores can have a length of at least 0.5 µm, at least 0.8 µm, at least 1 µm, at least 2 µm, at least 5 µm, at least 8 µm, at least 10 µm, at least 15 µm, at least 20 µm, at least 30 µm, at least 40 µm, at least 50 µm, or at least 60 µm.

Embodiment 12. The solid ion conductive layer of embodiment 11, wherein the length can be at most 100 µm, such as at most 90 µm, at most 80 µm, at most 70 µm, most 60 µm, at most 50 µm, or at most 40 µm.

Embodiment 13. The solid ion conductive layer of any one of embodiments 1 to 3, comprising a network of interconnecting flakes within a bulk of the solid ion conductive layer, wherein the flakes comprise the hygroscopic material, and wherein elongated pores extending through at least a portion of the network.

Embodiment 14. The solid ion conductive layer of embodiment 13, wherein the flakes comprises a thickness of at least 0.1 µm, at least 0.3 µm, at least 0.5 µm, at least 0.8 µm, at least 1 µm, at least 2 µm, at least 4 µm, or at least 5 µm.

Embodiment 15. The solid ion conductive layer of embodiment 13 or 14, wherein the flakes comprise a thickness of at most 20 µm, at most 18 µm, at most 15 µm, at most 12 µm, at most 10 µm, at most 9 µm, at most 8 µm, at most 6 µm, or at most 5 µm.

Embodiment 16. The solid ion conductive layer of any one of embodiments 13 to 15, wherein at least 30%, or at least 40%, or at least 50% of the elongated pores have an elongation orientation that forms an angle of 90±30 degree with a major surface of the ion conductive layer.

Embodiment 17. The solid ion conductive layer of any one of embodiments 13 to 15, wherein the elongated pores comprises a tortuosity at most 1.2, or at most 1.5, or at most 2, or at most 3.

Embodiment 18. The solid ion conductive layer of any one of embodiments 1 to 17, comprising pores including tortuous pores, needle-shaped pores, rod-shaped pores, spherical pores, cubic pores, octahedron-shaped pores, three-dimensional-shaped pores, or any combination thereof, wherein at least some of the pores are interconnected.

Embodiment 19. The solid ion conductive layer of any one of embodiments 1 to 3 and 18, comprising an average pore size of at least 50 nm, at least 100 nm, at least 200 nm, at least 300 nm, at least 400 nm, at least 500 nm, at least 600 nm, at least 700 nm, at least 800 nm, at least 900 nm, at least 1 microns, at least 2 microns, at least 3 microns, at least 5 microns, at least 10 microns, or at least 30 microns.

Embodiment 20. The solid ion conductive layer of embodiment 19, wherein the average pore size is at most 80 microns, at most 70 microns, at most 65 microns, such as at most 60 microns, at most 55 microns, at most 50 microns, at most 45 microns, at most 40 microns, at most 30 microns, at most 20 microns, or at most 15 microns.

Embodiment 21. The solid ion conductive layer of any one of embodiments 1 to 20, comprising a polymer including hydrogenated nitrile butadiene rubber, high density polyethylene, low density polyethylene, polyurethane, polystyrene, poly(propylene oxide), poly(vinylidene fluoride), poly(dimethysiloxane), poly[bis(methoxy ethoxyethoxide)-phosphazene], polypropylene glycol, polycaprolactone, and poly(trimethylene carbonate), poly(methyl acrylate), poly (vinylidene fluoride)-co-hexafluoropropylene, poly(acrylonitrile-co-butadiene), poly(styrene-butadiene-styrene), and styrene-ethylene-butylene-styrene, or a combination thereof.

Embodiment 22. The solid ion conductive layer of any one of embodiments 1 to 21, comprising a porosity of at least 5 vol % for a total volume of the solid ion conductive layer, at least 10 vol %, at least 20 vol %, at least 30 vol %, at least 50 vol %, at least 60 vol %, or at least 70 vol % for the total volume of the solid ion conductive layer.

Embodiment 23. The solid ion conductive layer of any one of embodiments 1 to 22, comprising a porosity of at most 80 vol %, at most 70 vol %, at most 60 vol %, at most 50 vol %, at most 40 vol %, or at most 30 vol % or for the total volume of the solid ion conductive layer.

Embodiment 24. The solid ion conductive layer of any one of embodiments 1 to 23, further comprising a polymeric electrolyte material.

Embodiment 25. The solid ionic conductive layer of embodiment 24, wherein the polymeric electrolyte material comprises poly(ethylene oxide), poly(propylene oxide), polyvinyl chloride, poly(vinylidene fluoride), poly(acrylonitrile), poly(dimethysiloxane), poly[bis(methoxy ethoxyethoxide)-phosphazene], polyethylene carbonate, polypropylene glycol, polycaprolactone, and poly(trimethylene carbonate).

Embodiment 26. The solid ionic conductive layer of embodiment 24 or 25, further comprising a lithium salt including $LiPF_6$, $LiClO_4$, $LiBF_4$, $LiAsF_6$, LiTf, LiSA, LiFSI, LiTFSI, LiBETI, LiCTFSI, LiBOB, LiTDI, LiPDI, LiDCTA, $LiB(CN)_4$, $LiSbF_6$, $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, or a combination thereof.

Embodiment 27. The solid ion conductive layer of any one of embodiments 1 to 26, further comprising an active electrode material.

Embodiment 28. The solid ionic conductive layer of embodiment 27, wherein the active electrode material comprises an active cathode material, wherein the active cathode material comprises an oxide including $LiCoO_2$, $LiFePO_4$, $LiMnPO_4$, $LiMn_2O_4$, $LiNi_{1/3}Co_{1/3}Mn_{1/3}O_2$, or a combination thereof.

Embodiment 29. The solid ion conductive layer of embodiment 3, wherein the first phase extends through a thickness of the solid ion conductive layer.

Embodiment 30. A multi-layer structure, comprising: an electrode layer overlying the solid ion conductive layer of any one of embodiments 1 to 29.

Embodiment 31. A multi-layer structure, comprising: a solid electrolyte layer comprising an ion conductive material including a halide-based material; and the ion conductive layer of any one of embodiments 1 to 29.

Embodiment 32. An electrochemical unit, comprising the solid ion conductive layer of any one of embodiments 1 to 29.

Embodiment 33. The solid ion conductive layer of embodiment 3, comprising a porosity of at most 10 vol % for a total volume of the solid ion conductive layer.

Embodiment 34. The method of embodiment 4, wherein the green layer is in a form of a tape.

Embodiment 35. The method of embodiment 4 or 31, further comprising forming a solid ion conductive layer from the green layer at a temperature from 20° C. to 400° C.

Embodiment 36. The method of any one of embodiments 4, 34, and 35, further comprising drying the green layer to form the solid ion conductive layer.

Embodiment 37. The method of any one of embodiments 4 and 34 to 36, further comprising sublimating ammonium halide to induce a porosity for forming the solid ion conductive layer, wherein the porosity comprises pores including open pores, closed pores, or a combination thereof.

Embodiment 38. The method of any one of embodiments 4 and 34 to 37, further comprising evaporating the at least one binder to induce a porosity for forming the solid ion conductive layer, wherein the porosity comprises pores including open pores, closed pores, or a combination thereof.

Embodiment 39. The method of any one of embodiments 4 and 34 to 38, wherein the green layer is a first green layer, wherein the method further comprises forming a second green layer overlying the first green layer.

Embodiment 40. The method of embodiment 39, wherein forming the first green layer and forming the second green layer are performed simultaneously.

Embodiment 41. The method of embodiment 39, comprising laminating the first green layer and the second green layer.

Embodiment 42. The method of any one of embodiments 39 to 41, comprising forming a dense layer from the second green layer.

Embodiment 43. The solid ion conductive layer or method of any one of embodiments 3 to 42, wherein the polymer comprises an HLB value of at most 10, at most 9, at most 8, at most 7, at most 6, at most 5, at most 4.6, at most 4.2, at most 4, at most 3.5, at most 3, at most 2.5, at most 2, at most 1, at most 0.5, or at most 0.1.

Embodiment 44. The solid ion conductive layer or method of any one of embodiments 3 to 42, wherein the polymer has a Moisture Absorption Rate of at most 1.0 wt %, such as at most 0.8 wt %, at most 0.5 wt %, at most 0.3 wt %, or at most 0.1 wt %.

Embodiment 45. The solid ion conductive layer or method of any one of embodiments 3 to 42, wherein the polymer has a Reactivity Value of at most 20%, at most 18%, at most 16%, at most 14%, at most 12%, at most 10%, such as at most 9%, at most 8%, at most 7%, at most 6%, at most 5%, at most 4%, at most 3%, or at most 2%.

Embodiment 46. The solid ion conductive layer or method of embodiment 3 or 4, wherein the binder comprises a polymer selected from the group consisting of paraffin wax, polypropylene carbonate, polyisobutylene, polyvinyl pyrrolidone, poly (methyl methacrylate), polyethylene glycol, hydrogenated nitrile butadiene rubber, high density polyethylene, low density polyethylene, poly(ethylene oxide), polyvinyl chloride, poly(acrylonitrile), polyethylene carbonate, polyurethane, polystyrene, poly(propylene oxide), poly(vinylidene fluoride), poly(dimethysiloxane), poly[bis (methoxy ethoxyethoxide)-phosphazene], polypropylene glycol, polycaprolactone, and poly(trimethylene carbonate), poly(methyl acrylate), poly(vinylidene fluoride)-co-hexafluoropropylene, poly(acrylonitrile-co-butadiene), poly (styrene-butadiene-styrene), and styrene-ethylene-butylene-styrene.

Embodiment 47. A composition, comprising a solid ion conductive material including a hygroscopic material and at least one of an organic material and ammonium halide, wherein the organic material has an HLB value of at most 10, a Reactivity Value of at most 20%, a MAR of at most 1.0 wt %, or a combination thereof.

Embodiment 48. The composition of embodiment 47, wherein the organic material comprises a polymer selected from the group consisting of paraffin wax, polypropylene carbonate, polyisobutylene, polyvinyl pyrrolidone, polyethylene glycol, hydrogenated nitrile butadiene rubber, high density polyethylene, low density polyethylene, poly(ethylene oxide), polyvinyl chloride, poly(acrylonitrile), polyethylene carbonate, polyurethane, polystyrene, poly(propylene oxide), poly(vinylidene fluoride), poly(dimethysiloxane), poly[bis(methoxy ethoxyethoxide)-phosphazene], polypropylene glycol, polycaprolactone, and poly(trimethylene carbonate), poly(methyl acrylate), poly(vinylidene fluoride)-co-hexafluoropropylene, poly(acrylonitrile-co-butadiene), poly(styrene-butadiene-styrene), poly (methyl methacrylate), and styrene-ethylene-butylene-styrene.

Embodiment 49. A slurry, comprising the composition of any one of embodiments 47 and 48 and a solvent including an HLB value of 0, a Reactivity Value of at most 20%, or a combination thereof.

Embodiment 50. The composition of embodiment 49, wherein the solvent comprises toluene, pentene, xylene, pentane, hexane, heptane, octane, nonane, decane, undecane, dodecane, cyclopentane, cyclohexane, cycloheptane, cyclooctane, cyclodecane, cycloundecane, cyclodocecane, dimethyl sulfide, dibromomethane, dichloromethane, o-chlorotoluene, o-dichlorobenzene, or any combination thereof.

Embodiment 51. The composition or slurry of any one of embodiments 47 to 50, comprising at least 1 wt % to at most 60 wt % of the organic material for the total weight of the composition.

Embodiment 52. The composition or slurry of any one of embodiments 47 to 51, comprising at least 1 wt % to at most 60 wt % of ammonium halide for the total weight of the composition.

Embodiment 53. The composition or slurry of any one of embodiments 47 to 52, comprising at least 20 wt % to at most 90 wt % of the ion conductive material for the total weight of the composition.

Embodiment 54. The slurry of any one of embodiments 49 to 53, comprising at least 2 wt % to at most 60 wt % of the solvent for the total weight of the composition.

Embodiment 55. The slurry of any one of embodiments 49 to 53, wherein the slurry is a colloidal suspension.

Embodiment 56. The solid ion conductive layer, the method, the slurry, or the composition of any one of embodiments 1 to 3, wherein the hygroscopic material comprises a halide-based material, a sulfide-based material, a lithium oxyhalide, a lithium halide hydroxide, or a combination thereof.

Embodiment 57. The solid ion conductive layer, the method, the slurry, or the composition of embodiment 56, wherein the halide-based material can be represented by $M_{3-\delta}(Me^{k+})_f X_{3-\delta+k*f}$, wherein $-3 \leq \delta < 3$, $0 \leq f \leq 1$, k is the valence of Me, $2 \leq k < 6$, M includes an alkali metal element, Me includes a metal element that is different from M, and X includes a halogen.

Embodiment 58. The solid ion conductive layer, the method, or the composition of embodiment 56, wherein the ion conductive material comprises $Li_3OCl$, $Li3OBr$, $Li3O(Cl, Br)$, $Li3OCl0.5Br0.5$, $Li_2OHX$, $Li_2OHCl$, $Li_2OHBr$, or a combination thereof.

Embodiment 59. The solid ion conductive layer, the method, the slurry, or the composition of embodiment 56, wherein the sulfide comprises xLi2S-yP2S5 (LPS) including 0.67Li2S-0.33P2S5, 80Li2S-20P2S5, 75Li2S-25P2S5, or 70Li2S-30P2S5, Li2S X, wherein X represents at least one sulfide of SiS2, GeS2, and B2S3, including 0.50Li2S-0.50GeS2, LiI—Li2S—SiS2 including 0.40LiI-0.36Li2S-0.24SiS2, 0.05Li4SiO4-0.57Li2S-0.38SiS2, Li3PO4-Li2S—SiS2 including 0.01Li3PO4-0.63Li2S-0.36SiS2, LiI—Li2S—B2S3 including 0.44LiI-0.30Li2S-0.26B2S3, LiI—Li2S—P2S5 including 0.45LiI-0.37Li2S-0.18P2S5, a-Li3PS4, Li10GeP2S12, Li6PS5Cl, Li6PS5Br, Li9.54Si1.74P1.44S11.7C10.3, Li10.35[Sn0.27Si1.08]P1.65S12, or any combination thereof.

Embodiment 60. The solid ion conductive layer, the method, the slurry, or the composition of any one of embodiments 1 to 59, wherein the ion conductive material comprises an ion conductivity in bulk of at least 0.1 mS/cm, at least 0.5 mS/cm, at least 1 mS/cm, at least 1.5 mS/cm, or at least 2 mS/cm.

Embodiment 61. The solid ion conductive layer, the method, the slurry, or the composition of any one of embodiments 1 to 60, wherein the ion conductive material comprises an ion conductivity in bulk of at most 50 mS/cm, at most 40 mS/cm, at most 35 mS/cm, at most 30 mS/cm, at most 20 mS/cm, at most 15 mS/cm, at most 10 mS/cm, at most 8 mS/cm, at most 6 mS/cm, at most 5 mS/cm, at most 3 mS/cm, at most 2.8 mS/cm, at most 2.5 mS/cm, at most 2.2. mS/cm, or at most 2 mS/cm.

Embodiment 62. A tape, comprising the composition or slurry of any one of embodiments 47 to 55.

EXAMPLES

Example 1

A slurry can be formed having the composition noted in Table 1. The slurry can be used to form a dense ion conductive layer as described in embodiments herein.

TABLE 1

| Formulation | Wt. % |
| --- | --- |
| $M_{3-\delta}Me^{k+}X_{3-\delta+k}$ (halide-based solid ion conductive material) | 35 |
| Toluene (solvent) | 50 |
| Polyisobutylene (binder) | 10 |
| Polyester/polyamide copolymer (dispersant) | 5 |

Example 2

An exemplary ion conductive material can be formed having the composition noted in Table 2 below according to embodiments herein.

TABLE 2

| Formulation | Wt. % |
| --- | --- |
| $M_{3-\delta}Me^{k+}X_{3-\delta+k}$ (halide-based solid ion conductive material) | 35 |
| QPAC ®25 polyethylene carbonate complexed with $LiPF_6$ (solid state polymer electrolyte & binder) | 25 |
| Toluene (solvent) | 35 |
| Polyester/polyamide copolymer (dispersant) | 5 |

Example 3

An exemplary porous ion conductive material can be formed using the composition noted in Table 3 below and NH$_4$X can be removed to induce porosity as described in embodiments herein.

TABLE 3

| Formulation | Wt. % |
|---|---|
| M$_{3-\delta}$Me$^{k+}$X$_{3-\delta+k}$ (halide-based solid ion conductive material) | 25 |
| Toluene (solvent) | 30 |
| NH$_4$Cl (pore former) | 20 |
| PMMA (pore former) | 10 |
| Polyisobutylene (binder) | 10 |
| Polyester/polyamide copolymer (dispersant) | 5 |

Example 4

A cathode composite layer can be formed using the composition noted in Table 4 in accordance with embodiments herein.

TABLE 4

| Formulation | Wt. % |
|---|---|
| M$_{3-\delta}$Me$^{k+}$X$_{3-\delta+k}$ (halide-based solid ion conductive material) | 20 |
| LiNi$_{1/3}$Co$_{1/3}$Mn$_{1/3}$O$_2$ | 30 |
| Toluene (solvent) | 35 |
| Polyisobutylene (binder) | 10 |
| Polyester/polyamide copolymer (dispersant) | 5 |

Example 5

Each of the organic solvent materials included in Table 5 below was mixed with Li$_3$YBr$_6$ powder to test Reactivity Values of the solvents in the manner described in embodiments herein. HLB values as determined in embodiments herein and dielectric constant of the solvents are also included.

TABLE 5

| Solvents | HLB value (Grifin's method) | Dielectric constant | Reactivity Value | Chemically compatible (Y/N) |
|---|---|---|---|---|
| n-Heptane, | 0 | 1.92 | 0 | Y |
| Cyclohexane | 0 | 2.02 | 0 | Y |
| Toluene | 0 | 2.38 | 0 | Y |
| o-Xylene | 0 | 2.57 | 0 | Y |
| o-Chlorotoluene | 0 | 4.45 | 0 | Y |
| Dibromomethane | 0 | 7.8 | 0 | Y |
| Dichloromethane | 0 | 8.93 | 0 | Y |
| o-Dichlorobenzene | 0 | 9.93 | 0 | Y |
| 1,2-Dichloroethane | 0 | 10.36 | 0 | Y |
| Acetonitrile | 0 | 35.7 | Indefinite | N |
| Dibutyl Ether | 2.46 | 3.1 | N/A | N |
| Anisole | 2.96 | 4.33 | N/A | N |
| Diethyl Ether | 4.32 | 4.33 | Indefinite | N |
| Isopropyl Alcohol | 5.67 | 19.92 | Indefinite | N |
| Tetraethyl Orthosilicate | 6.15 | 4.1 | N/A | N |
| 1,4-Dioxane | 7.27 | 2.25 | Indefinite | N |
| N-Methyl-2-Pyrrolidone | 8.48 | 32.2 | Indefinite | N |
| Acetone | 9.66 | 20.7 | Indefinite | N |
| Ethyl Acetate | 10 | 6.02 | Indefinite | N |
| N,N-Dimethylformamide | 11.5 | 36.71 | Indefinite | N |
| Dimethyl Carbonate | 13.33 | 3.09 | Indefinite | N |
| Water | 20 | 80.1 | Indefinite | N |

Figure 15:
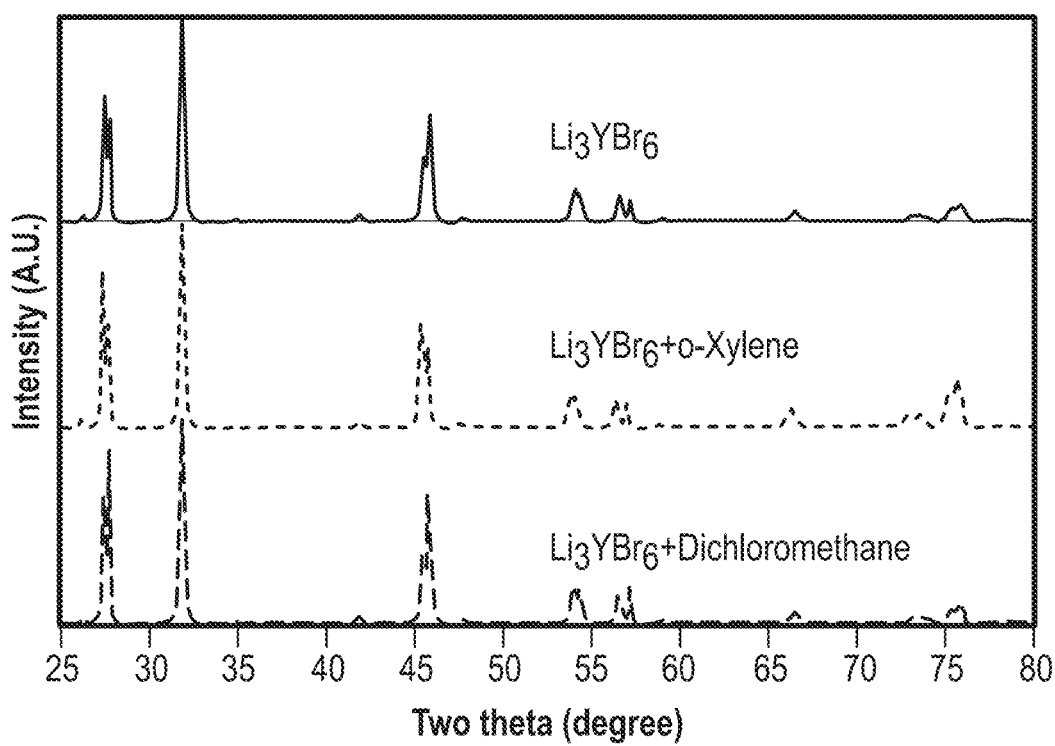
FIGS. 15 to 18 include illustrations including XRD patterns of samples according to embodiments herein.

FIG. 15 includes an illustration including the XRD pattern of $Li_3YBr_6$ powder an XRD-patterns of $Li_3YBr_6$ after being tested for Reactivity Values of xylene and dichloromethane as described in embodiments herein. The similar XRD patterns indicate xylene or dichloromethane does not cause decomposition of $Li_3YBr_6$.

Figure 16:
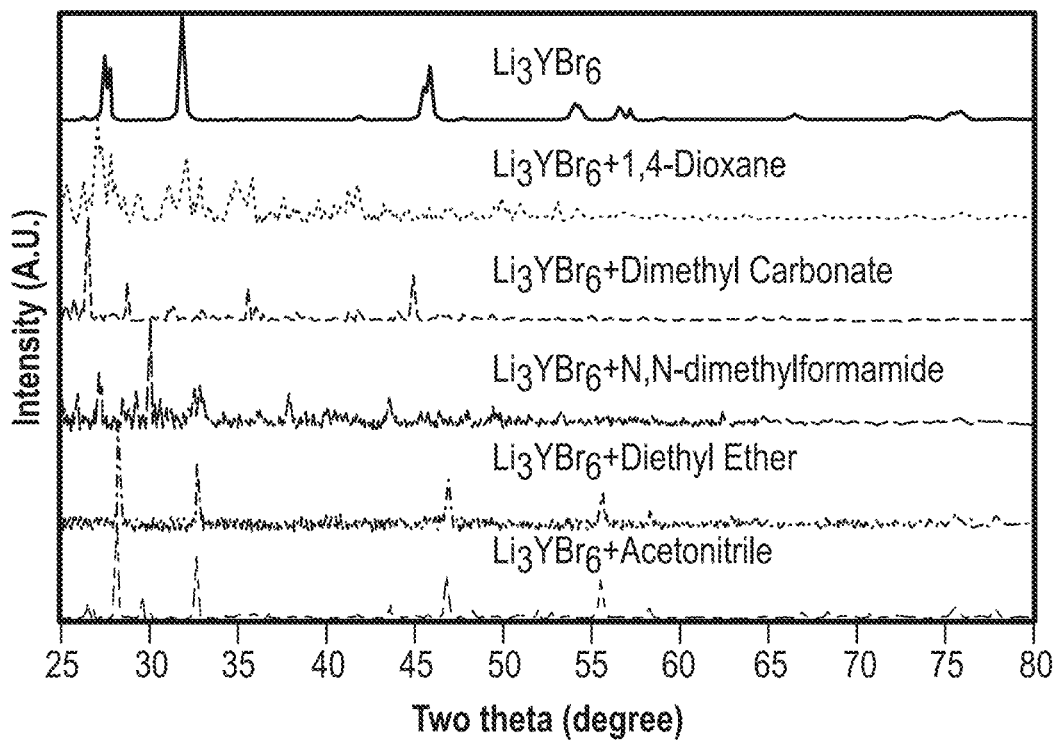

FIG. 16 includes an illustration including the XRD pattern of $Li_3YBr_6$ powder and XRD patterns of $Li_3YBr_6$ after being tested for Reactivity Values of 1,4-dioxane, dimethyl carbonate, N,N-dimethylformamide, diethyl ether, and acetonitrile as described in embodiments herein. The appearance of LiBr peaks and reduction of intensity of the characteristics peak of $Li_3YBr_6$ indicate significant decomposition of $Li_3YBr_6$.

Example 6

Each of the binder materials included in Table 6 below was mixed with $Li_3YBr_6$ powder to test Reactivity Values of the binders in the manner described in embodiments herein. HLB values and dielectric constant of the binders are also included.

TABLE 6

| Organic binder material | Abbreviation | HLB value (Grifin's Method) | Dielectric constant | Reactivity Value | Chemically compatible (Y/N) |
|---|---|---|---|---|---|
| Hydrogenated nitrile butadiene rubber | HNBR | 0 | 10 | 0 | Y |
| Styrene butadiene rubber | SBR | 0 | 7.0 | 0 | Y |
| Polyisobutylene | PIB | 0 | 2.2 | 0 | Y |
| Poly(vinylidene fluoride) | PVDF | 0 | 2.0 | 0 | Y |
| Poly(acrylonitrile) | PAN | 0 | 3.1 | 0 | Y |
| Paraffin wax | — | 0 | 2.1-2.5 | 0 | Y |
| Polyethylene | PE | 0 | 2.2 | 0 | Y |
| Polyvinyl chloride | PVC | 0 | 3.0 | 0 | Y |
| Poly(ethylene-co-vinyl acetate) | PEVA | 2.56 | 2.5-3 | 0 | Y |
| Poly(ethylene oxide) | PEO | 7.27 | 5 | 0 | Y |
| Polyvinyl pyrrolidone | PVP | 7.57 | N/A | 11.0% | Y |
| Poly(methyl methacrylate) | PMMA | 8.8 | 3.0 | 0 | Y |
| Poly(vinyl acetate) | PVA | 10.23 | 3.2 | Indefinite | N |
| Propylene carbonate | PC | 11.76 | 64 | Indefinite | N |

PVA and PC caused significant decomposition of $Li_3YBr_6$ powder when mixed with the $Li_3YBr_6$ powder. XRD analysis could not be performed.

Figure 17:
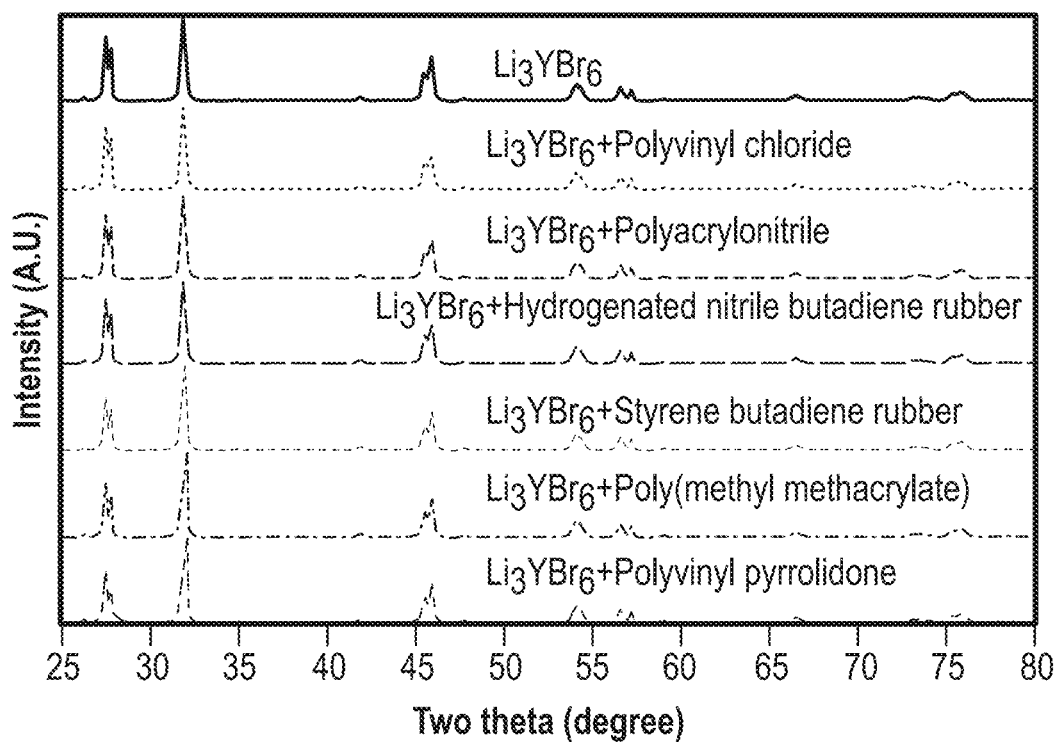

FIG. 17 includes an illustration including the XRD pattern of $Li_3YBr_6$ powder and XRD patterns of $Li_3YBr_6$ after being tested for Reactivity Values of poly(acrylonitrile), Hydrogenated nitrile butadiene rubber, Styrene-butadiene rubber, Poly(methyl methacrylate), and Polyvinyl pyrrolidone. The similar XRD patterns indicate the binder materials except polyvinyl pyrrolidone do not cause decomposition of $Li_3YBr_6$. Further as illustrated in FIG. 18, the decomposition of $Li_3YBr_6$ powder caused by polyvinyl pyrrolidone was not significant, and the Reactivity Value of polyvinyl pyrrolidone was determined to be 11%.

Example 7

Chemically compatible binders were further tested in forming solid ion conductive layers by tape casting.

Binder materials, polyisobutylene, styrene butadiene rubber, hydrogenated nitrile butadiene rubber, and poly(ethylene-co-vinyl acetate) were pre-dissolved in a chemically compatible solvent material, toluene, and then mixed with $Li_3YBr_6$ powder. All the samples were stored and handled in a dry inert environment. Vibratory mill jar and media was used to facilitate mixing. The mill jars were sealed when operating in vibratory mill equipment at a frequency of 30 Hz for 20 min. After milling, the mill jars were put back in glove box for further handling of the samples.

It was noted a dispersion solution or slurry could not be formed when $Li_3YBr_6$ powder was mixed with pre-dissolved PEVA.

Dispersions formed when pre-dissolved PIB, SBR, and HNBR was mixed with $Li_3YBr_6$ powder. Compositions of the mixtures are included in Table 7. Tape casting of the mixtures was performed on thin aluminum foil using a doctor blade. The tapes were allowed to dry without heat to ensure no cracking occurs.

TABLE 7

| Binder | PIB | | SBR | | HNBR | |
|---|---|---|---|---|---|---|
| Weight % | 2.50% | 5% | 2.50% | 5% | 2.50% | 5% |
| Measurement | (g) | | (g) | | (g) | |
| Disperbyk 2115 Solution (20% Disperbyk 2115 mixed in Toluene) | 0.158 | 0.149 | 0.150 | 0.150 | 0.150 | 0.150 |

TABLE 7-continued

| Binder | PIB | | SBR | | HNBR | |
|---|---|---|---|---|---|---|
| Toluene | 0.617 | 0.723 | 0.462 | 0.722 | 0.461 | 0.722 |
| Halide | 1.000 | 1.000 | 1.000 | 1.000 | 1.000 | 1.000 |
| Binder solution (20% binder dissolved in Toluene) | 0.128 | 0.264 | 0.128 | 0.263 | 0.128 | 0.263 |

It was noted by analyzing the cross-sections under a scanning electron microscope (SEM), the ion conductive layer formed with SBR as the binder included a relatively higher amount of pores comparing to layers formed with HNBR or PIB, indicating SBR may have lower adhesion or wettability of $Li_3YBr_6$ powder.

Figure 19:
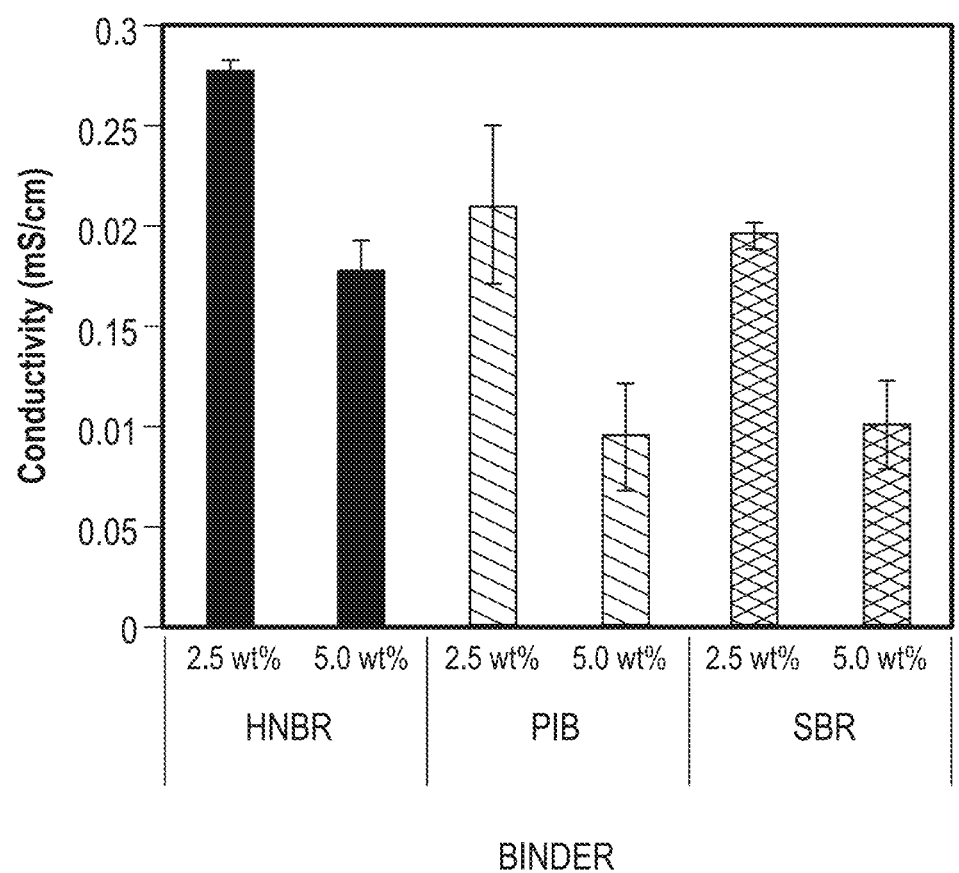
FIG. 19 includes a graph illustrating ionic conductivity of exemplary solid ion conductive layers according to embodiments herein.

Ion conductivity of the tapes was measured as follows and included in FIG. 19. 15 mm samples were punched out of the dried tape cast and placed into a Teflon die with stainless steel plungers in order to measure conductivity. The samples were compressed under 10 MPa of pressure and the resistance across the sample was measured through an impedance measurement. Once the test was completed, the sample was removed and the thickness was measured. The conductivity was calculated using the formula below:
Conductivity=Thickness/Area/Resistance Compressibility of the binders was determined by the changes in thickness of the tapes before and after testing the conductivity of the tapes and included in Table 8. Compressibility can be determined by the formula, $C_{Press}=[(T_B-T_A)/T_B]*100\%$, wherein $C_{Press}$ represents compressibility of the binder material, $T_B$ represents the thickness of the tape prior to the ion conductivity test, and $T_A$ represents the thickness of the tape after the ion conductivity test.

TABLE 8

| Binder material | SBR | | PIB | | HNBR | |
|---|---|---|---|---|---|---|
| Binder wt. % | 2.5 | 5 | 2.5 | 5 | 2.5 | 5 |
| Compressibility (%) | 36.2 | 45.9 | 43.0 | 32.8 | 38.0 | 44.1 |

Example 8

Each of the binder materials in Table 9 below was mixed with $Li_3YBr_6$ powder for forming a solid ion conductive layer.

PVC powder and plasticizer, Diisononyl phthalate (DINP), was mixed so that the mixture included 40 wt % of PVC and 60 wt % of DINP for the total weight of the mixture. The mixture of PVC and DINP was then mixed with $Li_3YBr_6$ powder, wherein the $Li_3YBr_6$ powder is at 60 wt % and the mixture of PVC and DINP is at 40 wt % for the total of mixture. It was noted mixing $Li_3YBr_6$ powder with PVC and DINP significantly increased the viscosity of the mixture. XRD analysis of the mixture of $Li_3YBr_6$ and DINP suggested minor decomposition of $Li_3YBr_6$ and low level of formation of lithium bromide (LiBr). The Reactivity Value of DINP is less than 10% and thus considered as chemically compatible with $Li_3YBr_6$. XRD analysis of the mixture of $Li_3YBr_6$ and PVC suggested PVC is chemically compatible with $Li_3YBr_6$.

TABLE 9

| Polymer Matrix | Compatibility with LYB | Curability |
|---|---|---|
| PVC (PVC + Plasticizer) | Yes | Yes |
| Silicone-epoxy and Catalyst- $B(C_6F_5)_3$ | Yes | No |
| Silicone and Catalyst-Sn | No | No |
| Silicone HCR and Catalyst- Peroxide | No | No |
| Silicone and Catalyst-Pt | Yes | No |
| Silicone and Catalyst-Pt (high concentration) | Yes | Yes |

Silicone-epoxy was pre-mixed with the catalyst at a weight ratio of 99 wt % of silicone: 1 wt % of $B(C_6F_5)_3$. The pre-mixture is then mixed with $Li_3YBr_6$ so that the pre-mixture is at 70 wt % and $Li_3YBr_6$ is at 30 wt % for the total of the premixture and $Li_3YBr_6$. It was noted that the mixture of silicone-epoxy, catalyst $B(C_6F_5)_3$ and $Li_3YBr_6$ powder was not able to fully cure at the curing conditions for silicone-epoxy, 120° C. for 30 min, and the mixture was not able to fully cure when the amount of the catalyst increased.

Silicone high consistency rubber (HCR) (Nouryon Silicone Gum RB6-0902) and the catalyst, peroxide, was pre-mixed with the catalyst at a weight ratio of 97 wt % of silicone HCR: 3 wt % of peroxide. The pre-mixture is then mixed with $Li_3YBr_6$ so that the pre-mixture is at 70 wt % and L3YBr6 is at 30 wt % for the total of the premixture and $Li_3YBr_6$. It was also noted the mixture of silicone HCR and the catalyst, peroxide, (Nouryon Peroxide PD-50-S-PS) and $Li_3YBr_6$ powder was not able to fully cure and the XRD patterns of the mixture of silicone HCR, peroxide, and $Li_3YBr_6$ demonstrated characteristic peaks of LiBr, indicating decomposition of $Li_3YBr_6$.

The pre-mixture of silicone and the catalyst, Sn (Nusil RT foam silicone R-2370) was mixed with $Li_3YBr_6$. The mixture was not able to fully cure, and the XRD analysis on the mixture suggested decomposition of $Li_3YBr_6$.

The pre-mixture of silicone and the catalyst of Pt (Nusil RT foam silicone R-2360) was mixed with $Li_3YBr_6$ at a weight percentage ratio of 50 wt % of pre-mixture: 50 wt % of $Li_3YBr_6$. The XRD analysis on the mixture indicates no decomposition of $Li_3YBr_6$ and the silicon and Pt catalyst is chemically compatible. The content of Pt in the premixture is 50 ppm relative to the weight of silicone. The mixture was not able to fully cure. Further analysis indicated impurity, ammonium bromide in the $Li_3YBr_6$ powder could have an effect on curing. An additional amount of Pt from 400 to 5000 ppm was added to the previous mixture of silicon, Pt catalyst, and $Li_3YBr_6$, and the new mixtures were able to cure at a temperature from 20° C. to 70° C. when the amount of Pt was increased to 600 ppm and above.

Example 9

TABLE 10

| Component | Function | Concentration |
|---|---|---|
| Divinyl PDMS | Base resin | 30-80 wt % |
| PDMS-co-PHMS | Crosslinker | 2-30 wt % |
| Platinum | Catalyst | (30 ppm)-1000 ppm |

Solid ionic conductive layers are formed using a binder material including the components noted in Table 10 with a halide-based ion conductive material. The binder material is mixed with the halide-based ion conductive material at a weight ratio of binder to halide-based ion conductive material of 0.1 wt %:99.9 wt %, 0.5 wt %:99.5 wt %, 1 wt %: 99 wt %, 1.5 wt %: 98.5 wt %, 2 wt %:98 wt %, 3 wt %: 98 wt %, 4 wt %:96 wt %, 5 wt %:95 wt %, 6 wt %: 94 wt %, 7 wt %:93 wt %, 8 wt %:92 wt %, 9 wt %:91 wt %, and 10 wt %: 90 wt % to form the ion conductive layers.

The present disclosure represents a departure from the art. The ion conductive layer of embodiments herein can have improved thickness, particular pore characteristics, and compositions, some or all of which in combination with other features can facilitate improved performance of the ion conductive layer. The ion conductive layer is expected to have improved ion current resistance and/or lithium ion conductivity. The processes noted in embodiments herein can allow improved control over thickness, porosity, pore characteristics and compositions of the ion conductive layer. The process may be particularly suitable for forming an ion conductive layer including a lithium-ion conductive material including a halide. The use of particular binder and pore-forming material and control of heating in combination with other process features can allow improved formation of ion conductive layer including a lithium-ion conductive material including a halide.

The ion conductive layer can be suitable for applications of solid-state lithium batteries and expected to facilitate improved performance of solid-state lithium batteries.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A layer, comprising:
   a solid ion conductive material including a halide-based material represented by formula $M_{3-\delta}(Me^{k+})_fX_{3-\delta+k*f}$, wherein $-3\leq\delta<3$, $0\leq f\leq 1$, k is the valence of Me, $2\leq k<6$, M includes Li, Me includes a metal element that is different from M, and X includes a halogen, wherein the halide-based material includes at least two metal elements; and
   an organic material including poly(vinylidene fluoride), polyisobutylene, or a combination thereof, wherein when the layer comprises a further organic material, the further organic material has a dielectric constant of at most 12,
   wherein the solid ion conductive material is at least 50 vol % for a total volume of the layer.

2. The layer of claim 1, wherein the organic material is at most 10 wt % for a total weight of the layer.

3. The layer of claim 1, comprising a porosity of at most 10 vol % for a total volume of the layer.

4. The layer of claim 1, wherein X includes at least one of Cl and Br.

5. The layer of claim 1, wherein Me includes a rare earth element, In, Al, Zr, or any combination thereof.

6. The layer of claim 1, wherein Me includes Y, In, or any combination thereof.

7. The layer of claim 1, wherein the further organic material has an HLB value of at most 10, a Reactivity of at most 20%, or any combination thereof.

8. A multi-layer structure, comprising an electrode overlying the layer of claim 1.

9. A layer, comprising:
   a solid ion conductive material including a halide-based material represented by formula $M_{3-\delta}(Me^{k+})_fX_{3-\delta+k*f}$, wherein $-3\leq\delta<3$, $0\leq f\leq 1$, k is the valence of Me, $2\leq k<6$, M includes Li, Me includes a metal element that is different from M, and X includes a halogen, wherein the halide-based material includes at least two metal elements;
   a cathode material; and
   an organic material including a polymer including a fluoro group, chloro group, or any combination thereof, wherein the polymer has a dielectric constant of at most 12,
   wherein the polymer material is at most 10 wt % for a total weight of the layer.

10. The layer of claim 9, wherein the polymer further comprises one or more groups of —CH$_3$, =CH$_2$, —CH$_2$—, —CH=, and —C$_6$H$_5$.

11. The layer of claim 9, wherein the polymer has an HLB value of 0.

12. The layer of claim 9, wherein the polymer comprises poly(vinylidene fluoride), polyvinyl chloride, poly(vinylidene fluoride-co-hexafluoropropylene), or any combination thereof.

13. A multi-layer structure, comprising:
   an electrolyte layer overlying the layer of claim 9,
   wherein the electrolyte comprises a solid electrolyte material.

14. The layer of claim 9, wherein the cathode material comprises one or more of lithium-containing oxides, transition metal fluorides, polyanion materials, fluorinated polyanion materials, transition metal sulfides, transition metal oxyfluorides, transition metal oxysulfides, and transition metal oxynitrides.

15. The layer of claim 9, wherein the cathode material comprises LiCoO$_2$, LiFePO$_4$, Li(NiCoAl)O$_2$, LiCoO$_2$, LiMnPO$_4$, LiMn$_2$O$_4$, LiNi$_{1/3}$Co$_{1/3}$Mn$_{1/3}$O$_2$, or any combination thereof.

16. The layer of claim 9, wherein the solid ion conductive material is at least 50 vol % for a total volume of the layer.

17. The layer of claim 9, wherein X includes at least one of Cl and Br, and wherein Me includes a rare earth element, a Group 13 element, a Group 4 element, or any combination thereof.

18. The layer of claim 9, wherein the organic material comprises poly(vinylidene fluoride).

19. A composition, comprising:
   a solid ion conductive material including a halide-based material represented by formula $M_{3-\delta}(Me^{k+})_fX_{3-\delta+k*f}$, wherein $-3\leq\delta<3$, $0\leq f\leq 1$, k is the valence of Me, $2\leq k<6$, M includes Li, Me includes a metal element that is different from M, and X includes a halogen, wherein the halide-based material includes at least two metal elements; and
   an organic material including poly(vinylidene fluoride), polyvinyl chloride, poly(vinylidene fluoride-co-hexafluoropropylene), polyisobutylene, or a combination thereof, wherein when the layer comprises a further organic material, the further organic material has a dielectric constant of at most 12, wherein the solid ion conductive material is at least 50 vol % for a total volume of the layer.

20. The composition of claim 19, further comprising an electron conductive material.

* * * * *